(12) United States Patent
Imamura

(10) Patent No.: US 11,487,582 B2
(45) Date of Patent: Nov. 1, 2022

(54) INFORMATION PROCESSING APPARATUS AND COMPUTER-READABLE RECORDING MEDIUM HAVING STORED THEREIN PROCESS ALLOCATION DETERMINING PROGRAM

(71) Applicant: FUJITSU LIMITED, Kawasaki (JP)

(72) Inventor: Satoshi Imamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 261 days.

(21) Appl. No.: 16/935,252

(22) Filed: Jul. 22, 2020

(65) Prior Publication Data
US 2021/0073039 A1 Mar. 11, 2021

(30) Foreign Application Priority Data
Sep. 10, 2019 (JP) .............................. JP2019-164643

(51) Int. Cl.
*G06F 9/50* (2006.01)
*G06F 9/445* (2018.01)
*G06F 12/122* (2016.01)
*G06F 9/30* (2018.01)

(52) U.S. Cl.
CPC ........ *G06F 9/5016* (2013.01); *G06F 9/30047* (2013.01); *G06F 9/44505* (2013.01); *G06F 12/122* (2013.01); *G06F 2212/1021* (2013.01)

(58) Field of Classification Search
CPC .................................................... G06F 9/5016
See application file for complete search history.

(56) References Cited

U.S. PATENT DOCUMENTS

| | | | |
|---|---|---|---|
| 2013/0047162 A1 | 2/2013 | Stefanov et al. | |
| 2014/0033220 A1* | 1/2014 | Campbell | G06F 9/544 |
| | | | 718/104 |
| 2016/0378652 A1 | 12/2016 | Takeda et al. | |
| 2017/0052898 A1* | 2/2017 | Ash | G06F 12/0893 |
| 2018/0039523 A1 | 2/2018 | Akamine et al. | |

FOREIGN PATENT DOCUMENTS

| | | |
|---|---|---|
| JP | 2013-047950 A | 3/2013 |
| JP | 2015-184794 A | 10/2015 |
| JP | 2017-062666 A | 3/2017 |
| JP | 2018-022345 A | 2/2018 |

OTHER PUBLICATIONS

Sergey Blagodurov et al.,"A Case for NUMA-aware Contention Management on Multicore Systems", USENIX Annual Technical Conference 2011, Scheduling Session, Jun. 15, 2011 (Total 15 pages).

* cited by examiner

*Primary Examiner* — Charlie Sun
(74) *Attorney, Agent, or Firm* — Fujitsu Patent Center

(57) ABSTRACT

An information processing apparatus including a plurality of groups, each group including a first memory, a second memory different in process speed from the first memory, and a processor including a memory controller that is connected to the first memory and the second memory and that controls an access from a process to the first memory and the second memory, wherein a first processor among a plurality of the processors of the plurality of groups is configured to determine, based on a characteristic of a plurality of the processes accessing data stored in the first memory or the second memory in each of the plurality of groups, an allocation of the plurality of processes onto the plurality of processors.

14 Claims, 17 Drawing Sheets

EXAMPLE OF PROCESS PERFORMANCE WHEN FOUR PROCESSES THAT ACCESS DRAM ARE SIMULTANEOUSLY EXECUTED IN SINGLE CPU SOCKET

FIG.9

EXAMPLE OF ALLOCATION LIST

~21

| SOCKET ID | PROCESS ID |
|---|---|
| 0 | 2, 3 |
| 1 | 1, 0 |

FIG.10

EXAMPLE OF PROCESS LIST ~33

| PROCESS ID | LLC MPKI | READ/WRITE | SEQUENTIAL/RANDOM | DRAM/PM |
|---|---|---|---|---|
| 2 | 50 | READ | SEQUENTIAL | DRAM |
| 1 | 30 | READ | RANDOM | PM |
| 0 | 10 | WRITE | SEQUENTIAL | PM |
| 3 | 1 | WRITE | RANDOM | DRAM |

FIG.11

EXAMPLE OF ALLOCATION LIST

~35

| SOCKET ID | PROCESS ID |
|---|---|
| 0 | 0, 3 |
| 1 | 1, 2 |

INFORMATION PROCESSING APPARATUS AND COMPUTER-READABLE RECORDING MEDIUM HAVING STORED THEREIN PROCESS ALLOCATION DETERMINING PROGRAM

CROSS-REFERENCE TO RELATED APPLICATION

This application is based upon and claims the benefit of priority of the prior Japanese Patent application No. 2019-164643, filed on Sep. 10, 2019, the entire contents of which are incorporated herein by reference.

FIELD

The embodiment discussed herein is directed to an information processing apparatus and a computer-readable recording medium having stored therein a process allocation determining program.

BACKGROUND

In an information processing apparatus such as a server or a Personal Computer (PC), an access to a main storage device exemplified by a memory, such as a Dynamic Random Access Memory (DRAM), is made by a processor such as a Central Processing Unit (CPU).

A processor includes one or more CPU cores (sometimes simply referred to as "cores") and a memory controller. The core executes a process (may be referred to as a "program") that accesses data stored in the memory, and the memory controller controls an access to a memory serving as an access target of the process to be executed.

As an information processing apparatus, a multi-processor system including multiple processors has been known. In a multi-processor system, allocation (arrangement) of multiple processes to multiple processors is achieved by the Operating System (OS) executed by at least one of the processors.

[Patent Document 1] Japanese Laid-open Patent Publication No. 2015-184794

[Patent Document 2] Japanese Laid-open Patent Publication No. 2018-022345

[Patent Document 3] Japanese Laid-open Patent Publication No. 2013-047950

[Patent Document 4] Japanese Laid-open Patent Publication No. 2017-062666

[Non-Patent Document 1] "A Case for NUMA-aware Contention Management on Multicore Systems", Sergey Blagodurov et al., USENIX Annual Technical Conference 2011, Scheduling session 15th of June, 2011

In recent years, memories adopting the next generation memory technique have appeared. As such a memory, a memory adopting, for example, Intel Optane DC Persistent Memory (hereinafter, sometimes referred to as "PM") (registered trademark) employing 3D XPoint (registered trademark) technique is known.

Compared with the DRAM, the PM has a lower process performance (particularly, a writing performance) (about one-tenth as an example), but are more inexpensive and larger in capacity (about ten-fold as an example).

Like the DRAM, the PM can be mounted on a memory slot, such as a Dual Inline Memory Module (DIMM) slot, and a memory controller controls accesses both to the DRAM and the PM. In other words, the DRAM, which is an example of a first memory, and the PM, which is an example of a second memory being different in process performance (process speed) from the DRAM coexist in the same storage (memory) layer.

However, allocation of multiple processes to multiple processors premises a case, where the memory controller controls the DRAM, but does not premise a case where the DRAM and the PM coexist in the same storage layer and the memory controller controls both the DRAM and the PM.

For example, when multiple processes including a process for accessing the DRAM and a process for accessing the PM are executed in parallel in a single processor, a conflict sometimes occurs between a process on the DRAM and a process on the PM in the memory controller. In this situation, the process performance of the processor may degrade because the process time (process delay) increases in the memory controller.

SUMMARY

According to an aspect of the embodiments, an information processing apparatus including a plurality of groups, each group including a first memory, a second memory different in process speed from the first memory, and a processor including a memory controller that is connected to the first memory and the second memory and that controls an access from a process to the first memory and the second memory, wherein a first processor among a plurality of the processors of the plurality of groups is configured to determine, based on a characteristic of a plurality of the processes accessing data stored in the first memory or the second memory in each of the plurality of groups, an allocation of the plurality of processes onto the plurality of processors.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram illustrating an example of an allocation list;

FIG. 10 is a diagram illustrating an example of a process list;

FIG. 11 is a diagram illustrating an example of an allocation list set when an allocation determiner determines an allocation of processes on the basis of the process list exemplarily illustrated in FIG. 10;

DESCRIPTION OF EMBODIMENT(S)

Figure 1:
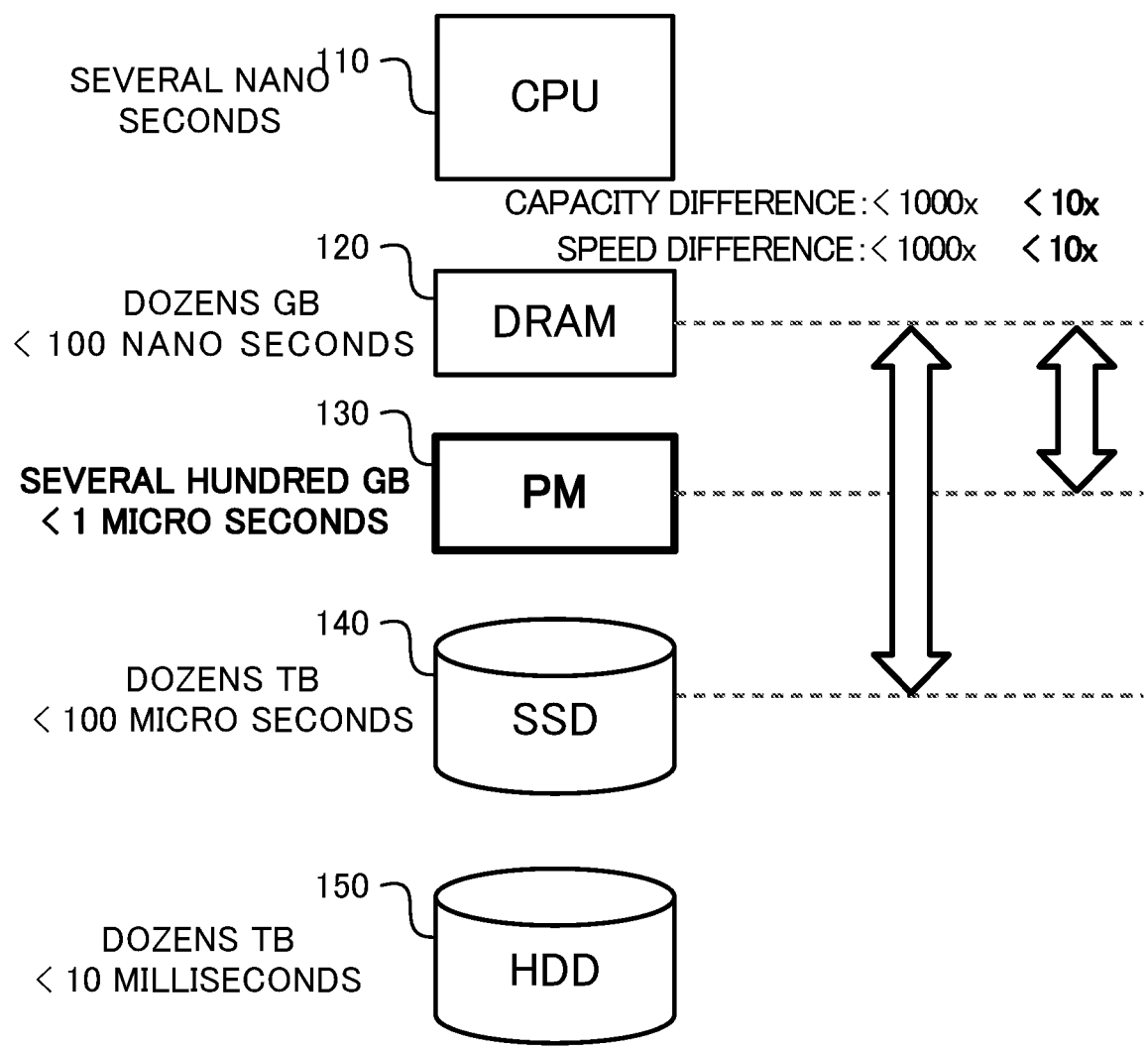
FIG. 1 is a diagram illustrating an example of a process speed and a storage capacity of each component provided in an information processing apparatus.

Hereinafter, an embodiment of the present invention will now be described with reference to the accompanying drawings. However, the embodiment described below is merely illustrative and there is no intention to exclude the application of various modifications and techniques not explicitly described below. For example, the present embodiment can be variously modified and implemented without departing from the scope thereof. In the drawings to be used in the following description, the same reference numbers denote the same or similar parts, unless otherwise specified.

[1] Embodiment

[1-1] Hybrid Memory System Using DRAMs and PMs

FIG. 1 is a diagram illustrating an example of process speeds (process performances) of components (modules) 110 to 150 provided in an information processing apparatus and, if the component is a storage device, the storage capacity thereof.

As exemplarily illustrated in FIG. 1, aligning the components in the descending order of a process speed results in a CPU 110, a DRAM 120, a PM 130, an SSD (Solid State Drive) 140, and a HDD (Hard Disk Drive) 150. Aligning the components in the descending order of a storage capacity results in the HDD 150, the SSD 140, the PM 130, and the DRAM 120. Being compared with the SSD 140, the DRAM 120 has a process speed of about 1000 times, and a storage capacity of about ⅟1000 times. The PM 130 is positioned between the DRAM 120 and the SSD 140 in terms of the process speed and the storage capacity, and when being compared with the PM 130, the DRAM 120 has a process speed of about ten times and a storage capacity of about one tenth.

This means that although being lower in process performance (particularly, writing performance) and lower in writing tolerance than the DRAM 120, the PM 130 is less expensive and larger in volume than DRAM 120. Similar to the DRAM 120, the PM 130 can be accessed in a unit of a byte and can be mounted on a memory slot such as a DIMM slot. Furthermore, since the PM 130 is non-volatile unlike the DRAM 120, the data in the PM 130 does not vanish when the power supply is cut off.

For these reasons, it is expected that an information processing apparatus mounting thereon both the DRAM 120 and the PM 130 as memory (main storage device) will become popular.

Figure 2:
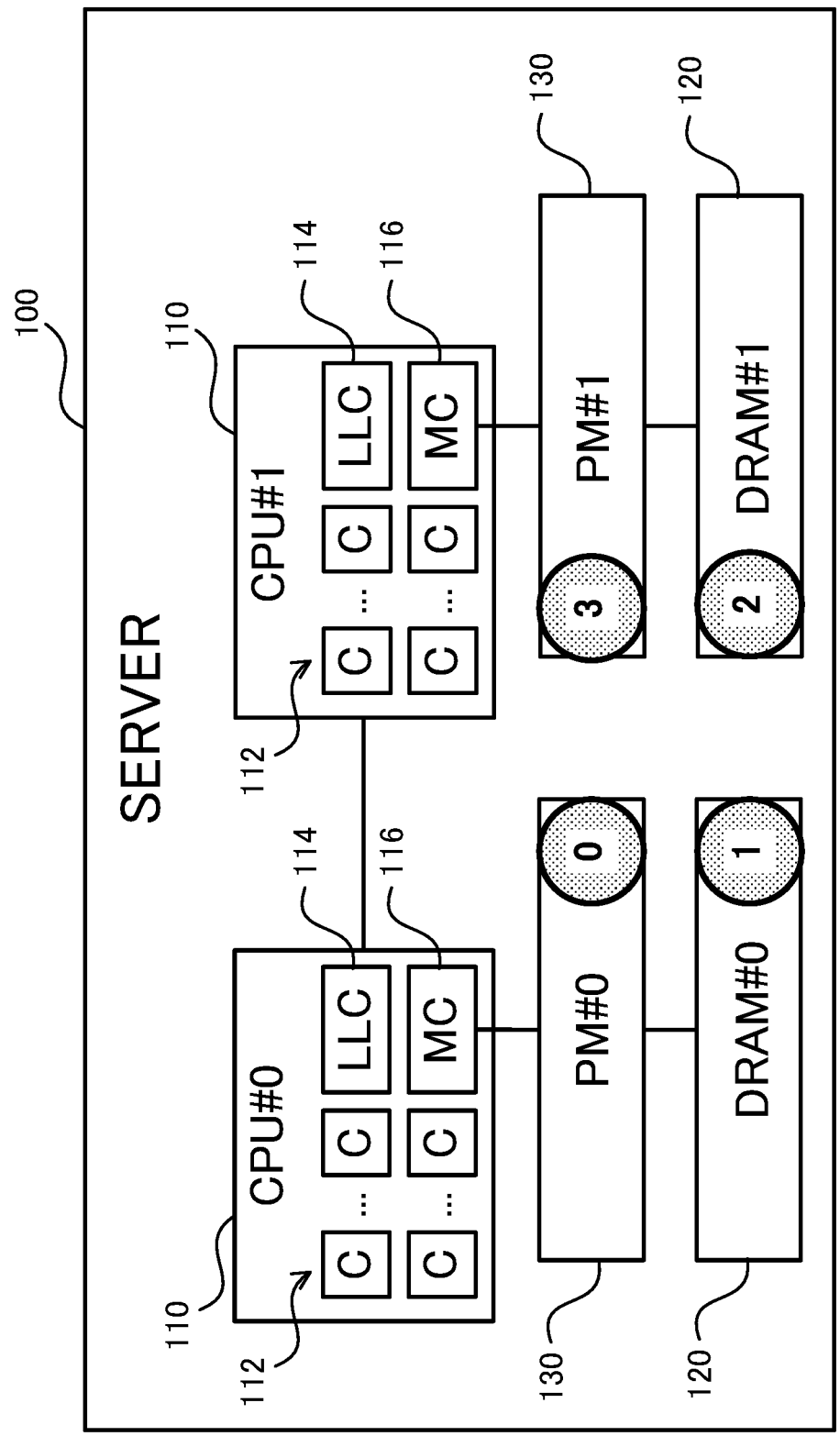
FIG. 2 is a block diagram schematically illustrating an example of a hardware (HW) configuration of a server in which both DRAMs and PMs are mounted as memories.

FIG. 2 is a block diagram schematically illustrating an example of a hardware (HW) configuration of a server 100 in which both DRAMs 120 and PMs 130 are mounted as memories.

As illustrated in FIG. 2, the server 100 is illustratively provided with multiple (two in the example of FIG. 2) CPU sockets, each of which includes the CPU 110. The server 100 constitutes a hybrid memory system by using the DRAMs 120 and the PMs 130. In the hybrid memory system, the DRAM 120 serving as an example of a first memory and the PM 130 serving as an example of a second memory different in process performance (process speed) from the DRAM 120 coexist in the same storage (memory) layer.

Each CPU 110 includes multiple cores (each represented by "C" in FIG. 2) 112, a last-level cache (represented by "LLC" in FIG. 2) 114, and a memory controller (represented by "MC" in FIG. 2) 116.

In each CPU socket (CPU 110), multiple processes are executed simultaneously (in parallel) by the multiple cores 112. Each process stores data into either the DRAM 120 or the PM 130. For example, as illustrated in FIG. 2, in the CPU #0, the data of the process 0 executed by the core 112 is stored in the PM #0, and the data of the process 1 executed by the core 112 is stored in the DRAM #0. In the CPU #1, the data of the process 2 executed by the core 112 is stored in the DRAM #1, and the data of the process 3 executed by the core 112 is stored in the PM #1.

The LLC 114 is the cache memory of the lowest layer (in other words, on the MC 116 side) among the cache memories of multiple layers included in each CPU 110. In the example of FIG. 2, illustration of cache memories except for the LLCs 114 is omitted. The LLC 114 is different with the type of the CPU 110, and corresponds to, as an example, a cache memory having the largest numerical value following "L" among cache memories called an L1 (primary) cache, an L2 (secondary) cache, an L3 (tertiary) cache, . . . , and the like.

The MC 116 of each CPU 110 is connected, via the same memory channel, to one or more (one in the example of FIG. 2) DRAMs 120 and one or more (one in the example of FIG. 2) PMs 130 to manage both the DRAMs 120 and the PMs 130. For example, the MC 116 may associate respective different address ranges with the DRAM 120 and the PM 130 and alternatively access the DRAM 120 or the PM 130 via the shared memory channel, with reference to the memory address assigned from the core 112.

For this reason, the MC 116 may undergo a conflict between an access to the DRAM 120 and an access to the PM 130.

Figure 3:
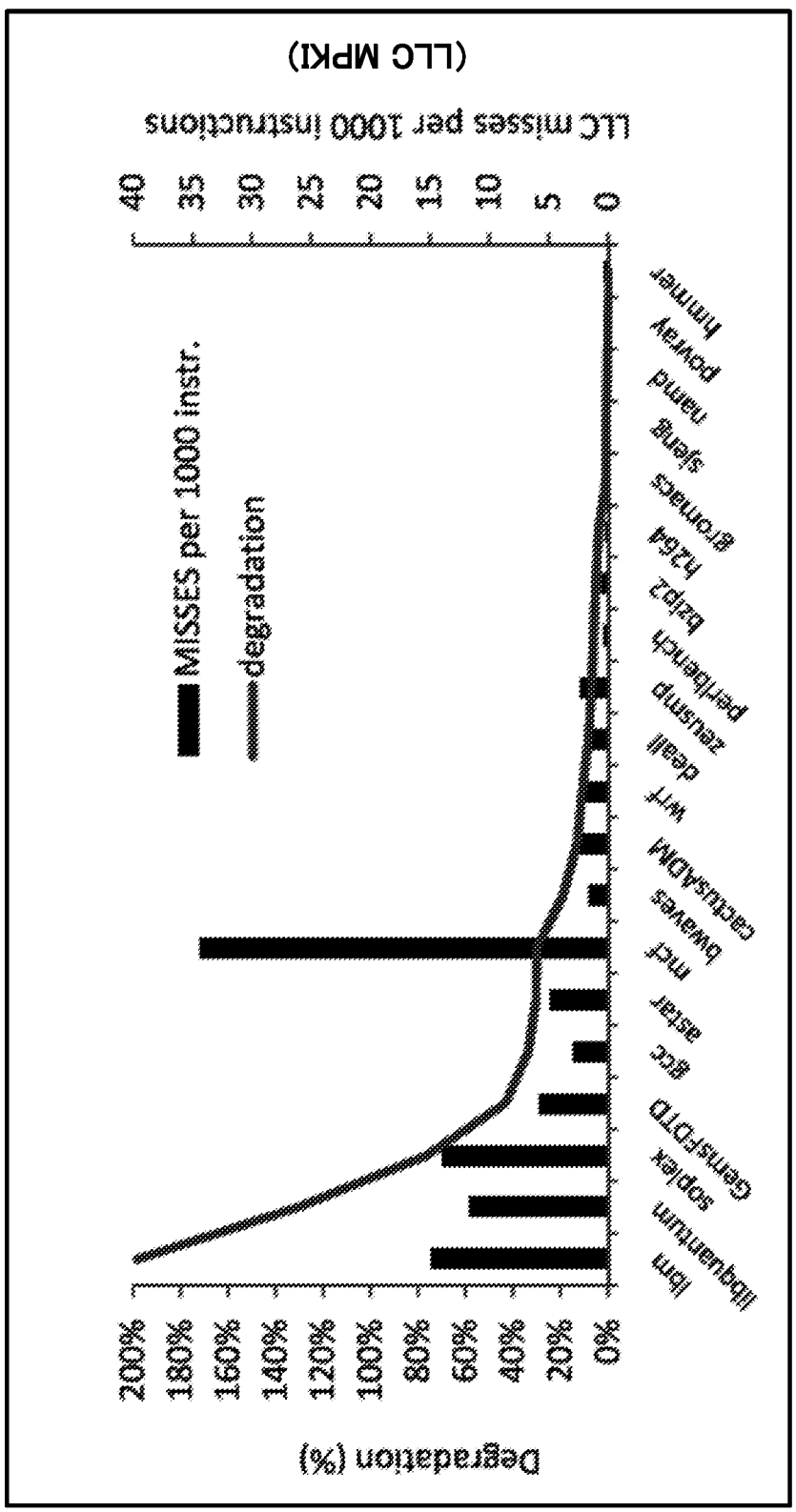
FIG. 3 is a diagram illustrating an example of a process performance when four processes that access the DRAM are simultaneously executed in a single CPU socket.

FIG. 3 is a diagram illustrating an example of a process performance when four processes that access the DRAM 120 are simultaneously executed in a single CPU socket. For example, FIG. 3 assumes a case where the main storage device consists only of the DRAM(s) 120. In FIG. 3, the horizontal axis indicates a type of process. In addition, the left vertical axis (line graph) indicates the rate of performance degradation of a process, and the right vertical axis (bar graph) indicates the cache miss count (LLC MPKI) representing the number of times of occurrence of cache miss in the LLC 114 per 1000 instructions.

A higher LLC MPKI means more cache misses per 1000 instructions and more accesses are made to the DRAM 120 (more frequently accessed). That is, the LLC MPKI can be regarded as an example of a memory access frequency.

As illustrated in FIG. 3, when four processes are executed simultaneously in a single CPU socket, the performance of each process is degraded as compared to the case where a process is solely executed. This is mainly caused by occurrence of conflict in the shared memory resources such as the LLC 114 and the MC 116. Furthermore, a process having a higher memory access frequency exemplified by the LLC MPKI undergoes larger degradation in performance.

Figure 4:
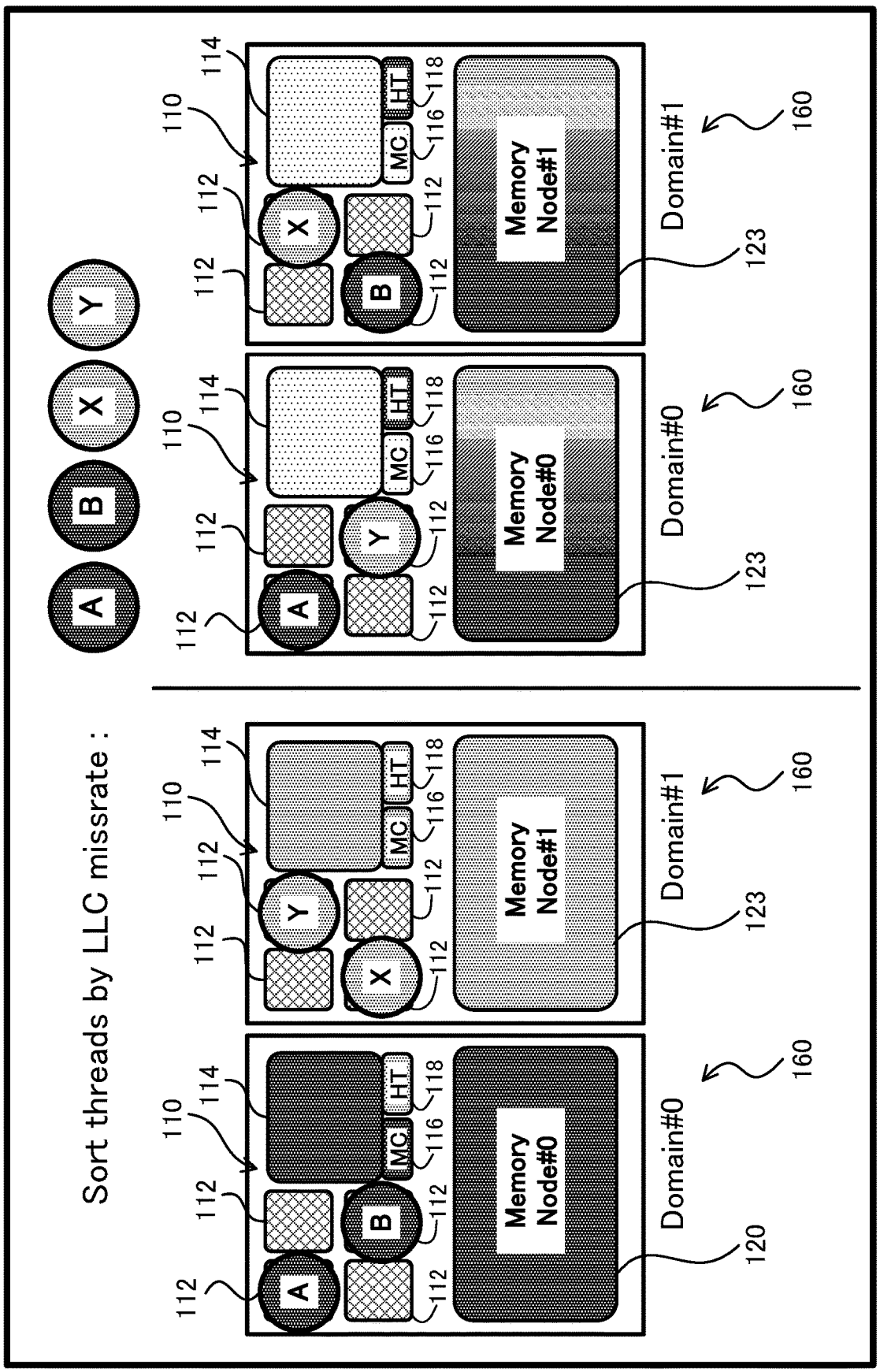
FIG. 4 is a diagram illustrating an example of a manner of allocating processes between CPU sockets on the basis of a memory access frequency.

As a conceivable solution to the above inconvenience, for example, processes are appropriately allocated to (arranged in) the multiple CPU sockets on the basis of the memory access frequencies. FIG. 4 is a diagram illustrating an example of a manner of allocating processes between CPU sockets on the basis of a memory access frequency. As illustrated in FIG. 4, sorting the four processes in the order of the larger LLC MPKI results in the order of A, B, X, and Y.

The left side of the drawing of FIG. 4 illustrates an example in which, in the two domains 160 each including the CPU 110 and the DRAM 120, processes A and B are allocated to (arranged in) the "domain #0", and processes X and Y are allocated to the "domain #1". In this case, the processes A and B each having a high LLC MPKI are concentrated on a single domain #0. Therefore, as indicated in the dark shading in FIG. 4, the processing load is concentrated on the LLC 114, the MC 116, and a memory node #0 (DRAM 120) in the domain #0 and consequently a decrease, in process performance occurs.

Incidentally, in FIG. 4, a higher shading density in each of processes, the LLCs 114, the MCs 116, HTs 118, and the DRAMs 120 means a higher process load (higher frequency of occurrence of a conflict). The HT 118 is a hypertransport that communicates with other domains 160.

In contrast, the right side of the drawing of FIG. 4 illustrates an example in which, processes A and Y are allocated to (arranged in) the "domain #0" and processes B and X are allocated to "domain #1". In the example on the right side of the drawing of FIG. 4, the processes having high memory access frequencies are distributed as much as possible to different CPU sockets, and the data of each process is stored in the DRAM 120 of the CPU socket that the process is allocated to. This allows the shading densities of the LLC 114, the MC 116, the HT 118 and the DRAM 120 of one domain 160 makes similar to those in the other domain 160 in the example on the right side of the drawing of FIG. 4. In other words, it is possible to alleviate conflicts between, for example, the LLC 114, the MC 116, and the like, in the each CPU socket.

However, in a hybrid memory system including the DRAM 120 and the PM 130, the verification by the inventor has found that the degree of performance degradation largely varies with the types of processes to be performed simultaneously, even if the memory access frequency of each of the processes is almost the same. For example, the following tendencies (i) and (ii) were obtained depending on the types of processes (which may be referred to as "characteristic" or "feature") that is executed simultaneously in a single CPU socket.

In the following description, a simple "access" shall mean one of or both a "random access" and a "sequential access". An "access" shall mean one or both "reading" and "writing".

(i) In the case of a combination of "a first process to access a DRAM" and "a second process to randomly read data from a PM", the performance degradation by the simultaneous (parallel) execution of the two processes is small.

(ii) In the case of a combination of "a third process having a high memory access frequency" and "a fourth process to write data into a PM", the degree of performance degradation of the third process is large, but the degree of performance degradation of the fourth process is small.

One reason for the above (i) is that a random access is reluctant to hinder a memory access of another process.

Figure 5:
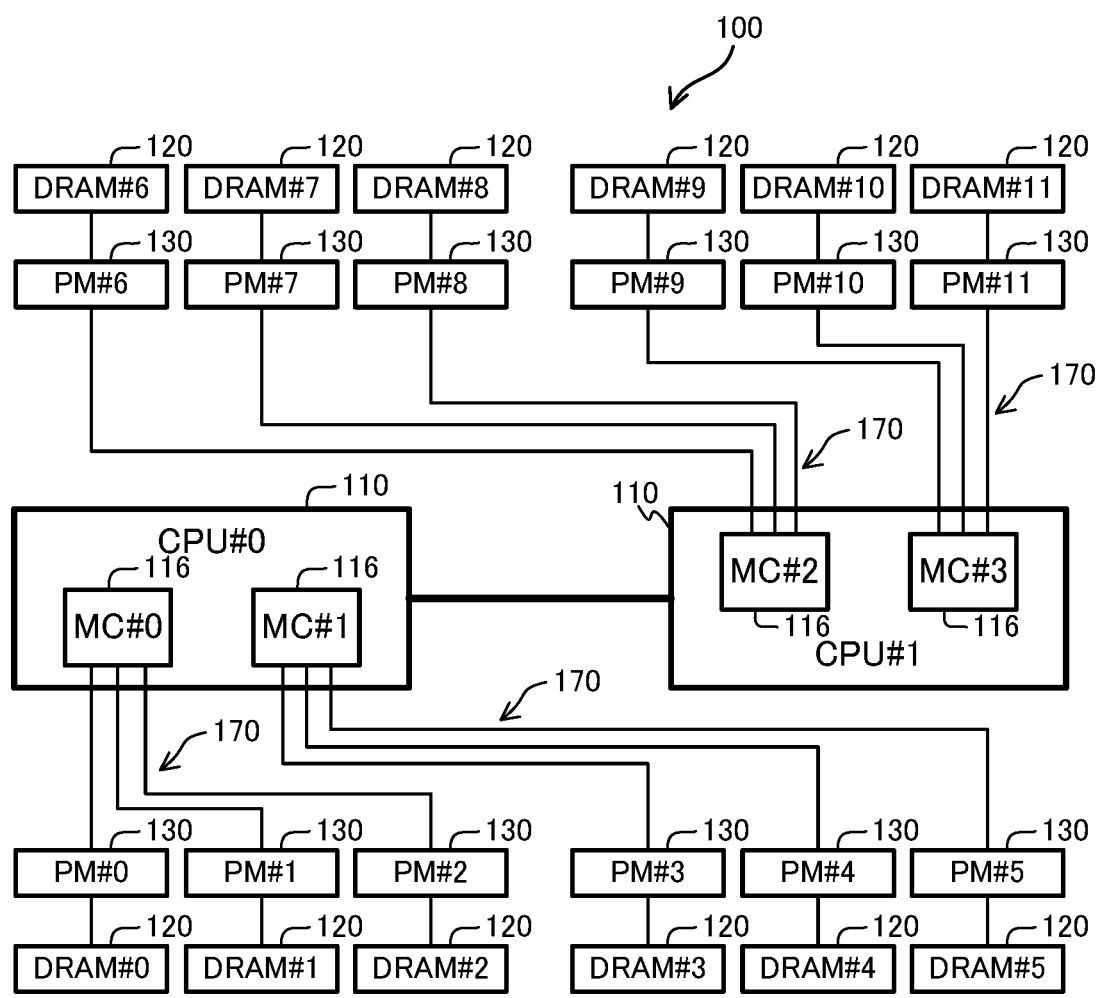
FIG. 5 is a block diagram schematically illustrating an example of a connecting configuration among CPUs, DRAMs, and PMs in a server.

FIG. 5 is a block diagram schematically illustrating an example of a connecting configuration among the CPUs 110, the DRAMs 120, and the PMs 130 in the server 100. As illustrated in FIG. 5, one DRAM 120 and one PM 130 constitute a group (set) that uses a common memory channel 170. In FIG. 5, the DRAM 120 and the PM 130 constituting the same group are denoted as "DRAM #x" and "PM #x" by using the common subscript "x" (where "x" is an integer equal to or greater than 0).

In the example of FIG. 5, the DRAM 120 and the PM 130 are connected in a cascaded manner, but the connection is not limited to a cascade. Alternatively, the DRAM 120 and the PM 130 may be connected in parallel with each other through a circuit such as a buffer. Further alternatively, a group of the DRAM 120 and the PM 130 may include two or more DRAMs 120 and/or two or more PMs 130.

The CPU 110 and multiple groups including the DRAM 120 and the PM 130 are connected in parallel via multiple memory channels 170 (sometimes referred to as memory channels #x for convenience). In each memory channel 170, respective different address ranges are assigned to the DRAM 120 and the PM 130, and the MC 116 alternatively accesses the DRAM 120 or the PM 130 through the corresponding memory channel 170 with reference to the memory address of an access target.

Therefore, for example, in cases where a first process to access the DRAM and a second process to sequentially access the PM are executed at the same time in the CPU #0, the memory access of the first process is inhibited because the access of the second process is interleaved to memory channels #0 to #5.

In contrast to the above, for example, in cases where a first process to access the DRAM and a second process to randomly access the PM 130 are executed at the same time, the access targets of the random access are not distributed to the PM #0 to the PM #5. Therefore, the degree of conflict between the access to the DRAM by the first process and the random access to the PM by the second process is small. On the other hand, when the second process randomly writes data into the PM 130, since the PM 130 has a lower writing performance than that of the DRAM 120 as described above, a conflict with the first process tends to more easily occur as compared with the case of random reading.

Another reason for the above (i) is that a memory accesses are dividedly performed to the DRAM 120 and the PM 130, thereby alleviating the interference between the DRAM 120 and the PM 130.

For example, in cases where multiple processes make memory accesses to the same DRAM 120, a conflict occurs in the buffer of the DRAM 120. On the other hand, in cases where the first process accesses the DRAM 120 and the second process accesses the PM 130, the conflict in the buffer of the PM 130 and the buffer of the DRAM 120 is mitigated because the data is distributed to the both buffers.

In addition, one of the reasons for the above (ii) is that a writing request to the PM 130 requiring a long process time stays in a queue of the MC 116, and the writing request to the PM 130 is processed in preference to a memory access of the third process.

The MC 116 is provided with queues (which may be a shared queue) associated one with each of the DRAM 120 and the PM 130, and preferentially processes a queue in which more memory access requests stay. Therefore, the memory access of the fourth process is preferentially processed over the third process, and the degree of performance degradation of the fourth process is small. However, the memory access of the third process is delayed and the degree of performance degradation of the third process increases.

Here, it is assumed that the first process and the third process in the above (i) and (ii) are the processes A and B illustrated in FIG. 4, respectively, and the second process and the fourth process are the processes Y and X illustrated in FIG. 4, respectively.

In this case, in the domain #0, the degrees of performance degradation of the processes A and Y are small like the example of the above (i), but in the domain #1, the degree of performance degradation of the process B is large like the example of the above (ii).

As the above, in the hybrid memory system, due to tendencies exemplified in the above (i) and (ii), the manner described with reference to FIG. 4 may have a difficulty in appropriately allocate a process.

Therefore, in one embodiment, description will be made in relation to a manner of suppressing lowering of a process performance in an information processing apparatus including a processor having a memory controller that controls accesses from processes to first and second memories having different process speeds each other.

[1-9] Example of Configuration of One Embodiment

[1-2-1] Example of Hardware Configuration

Figure 6:
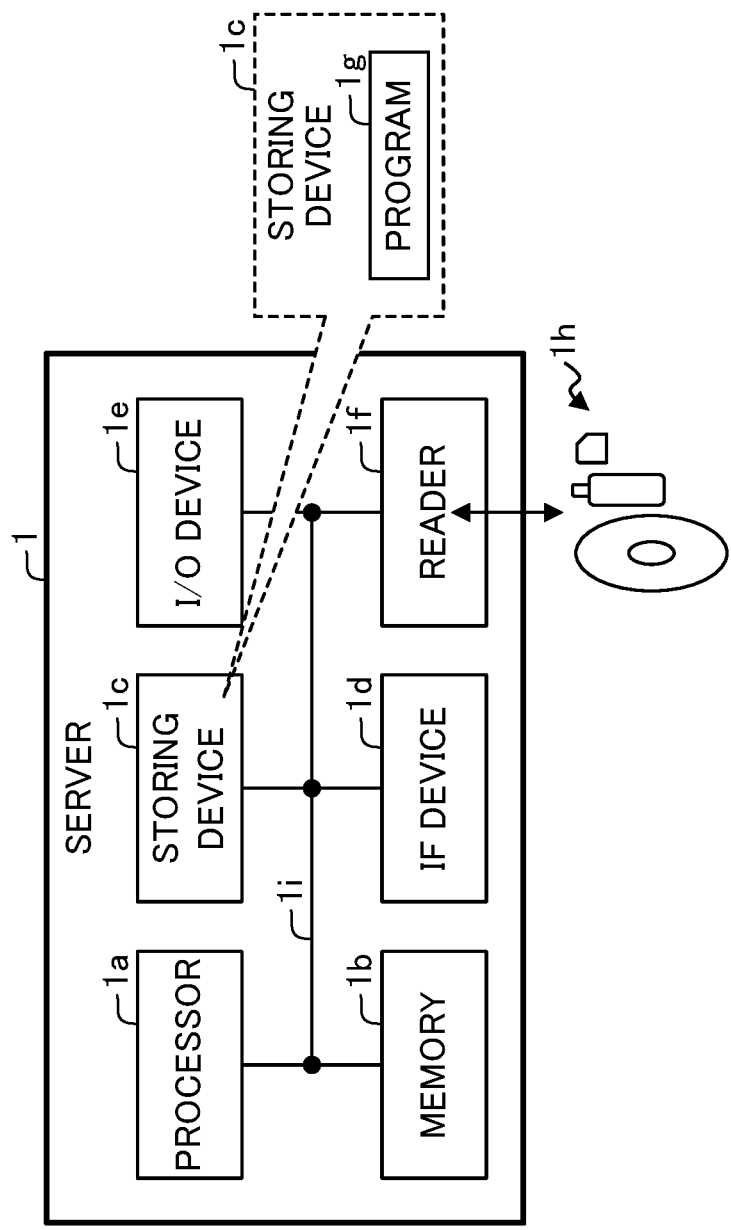
FIG. 6 is a block diagram schematically illustrating an example of a HW configuration of a server according to an embodiment.

FIG. 6 is a block diagram illustrating an example of the HW configuration of a server 1 according to one embodiment. The server 1 is an example of the information processing apparatus. As the information processing apparatus include, the server may be substituted with various computers such as a PC, a mainframe, and the like. The server 1 may include, by way of example, a processor 1a, a memory 1b, a storing device 1c, an IP (Interface) device 1d, an I/O (Input/Output) device 1e, and a reader 1f as the HW configuration.

The processor 1a is an example of an arithmetic processing apparatus that performs various controls and arithmetic operations. The processor 1a may be communicably connected to the blocks in server 1 to each other via a bus 1i. In one embodiment, the processor 1a may be a multiprocessor including multiple processors (e.g., multiple CPUs). Also, each of the multiple processor may be a multi-core processor having multiple processor cores.

Figure 7:
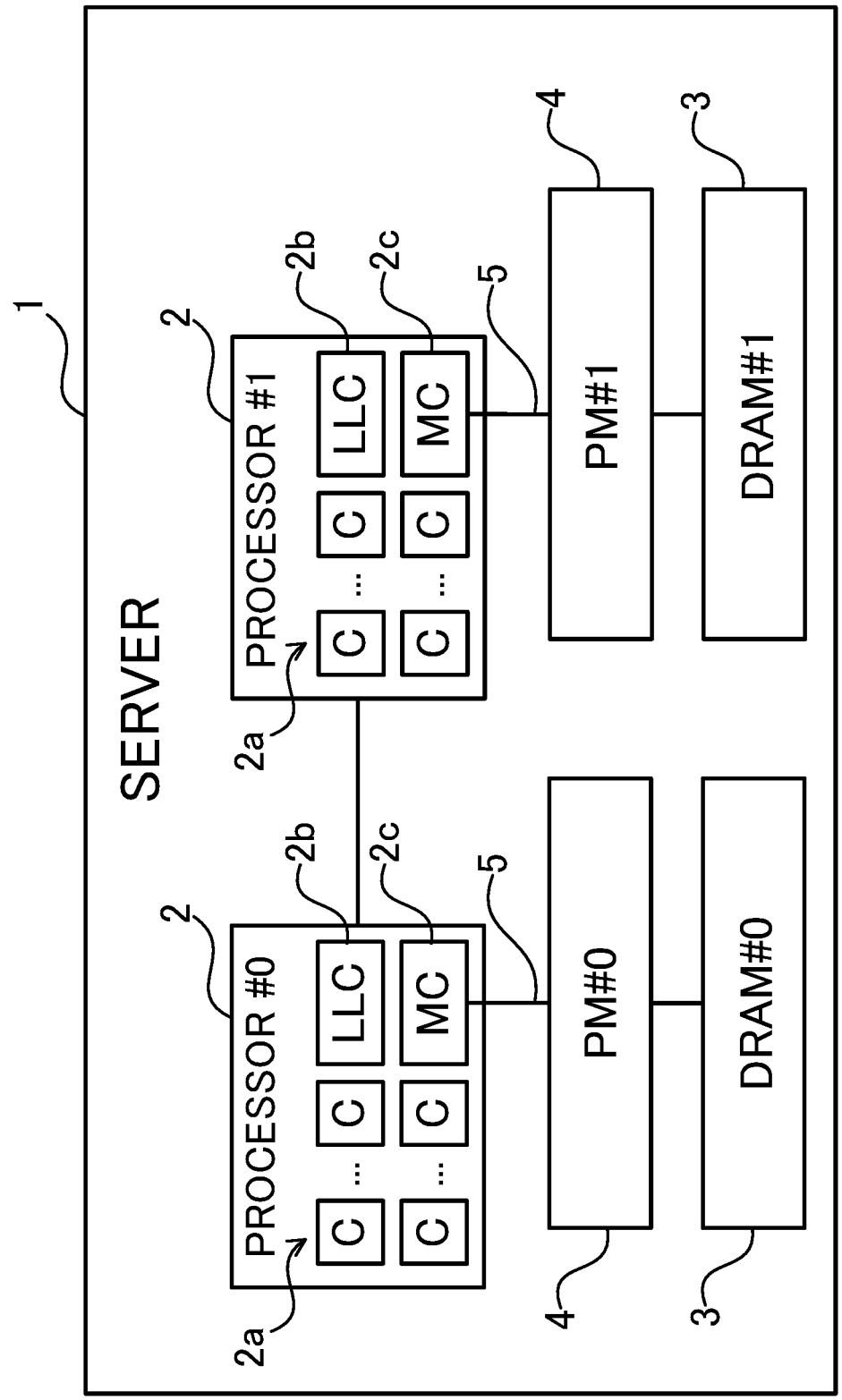
FIG. 7 is a block diagram schematically illustrating an example of a HW configuration focusing on processors and memories of a server according to the embodiment.

FIG. 7 is a block diagram schematically illustrating an example of the HW configuration focusing on the processor 1a and the memory 1b of the server 1 according to one embodiment. As exemplarily illustrated in FIG. 7, the processor 1a illustrated in FIG. 6 may be multiple (two in the example of FIG. 7) processors 2. Each processor 2 may include, multiple cores (represented by WCW) 2a, the LLC 2b, and the MC 2c. The cores 2a in multiple processors 2 may be communicably connected to each other by means of, for example, interconnection via respective interfaces such as HTs in the respective processors 2.

The LLC 2b is the cache memory of the lowest layer (in other words, MC 2c side) among the cache memories of multiple layers included in each processor 2. The example of FIG. 7 omits the illustration of the cache memory except for the LLCs 2b.

The MC 2c is connected to one or more (one in the example of FIG. 7) DRAMs 3 and one or more (one in the example of FIG. 7) PMs 4 via the same (common) memory channel 5 to manage both the DRAMs 3 and the PMs 4. For example, the MC 2c may associate different address ranges one to each of the DRAM 3 and the PM 4 and alternatively accesses the DRAM 3 or the PM 4 via the common memory channel 5 with reference to a memory address specified from the core 2a. In other words, the MC 2c may control accesses from processes to the DRAM 3 and the PM 4.

As the processor 1a, the CPU may be replaced with an Integrated Circuit (IC) such as Micro Processing Unit (MPU), a Graphics Processing Unit (GPU), an Accelerated Processing Unit (APU), a Digital Signal Processor (DSP), an Application Specific IC (ASIC), and a Field-Programmable Gate Array (FPGA).

Referring back to the description of FIG. 6, the memory 1b is an example of a HW device that stores information such as various data pieces and a program. The memory 1b includes, for example, both a volatile memory such as the DRAM, and a non-volatile memory such as the PM. This means that, the server 1 according to one embodiment may achieve the hybrid memory system that uses the DRAM and the PM.

For example, as illustrated in FIG. 7, the memory 1b may include one or more groups (sets) each including one or more DRAMs 3 and one or more PMs 4 for each processor 2. The example of FIG. 7 assumes that, for simplicity of description, each processor 2 (or each MC 2c) is provided with one DRAM 3 and one PM 4, but the configuration is not limited this. Alternatively, as illustrated in FIG. 5, each MC 116 (each MC 2c) may be provided with two or more groups each including the DRAMs 3 and the PMs 4.

Note that the DRAM 3 is an example of the first memory, and the PM 4 is an example of the second memory that differs (e.g., is slow) in process speed from the first memory.

Referring back to the description of FIG. 6, the storing device 1c is an example of a HW device that stores information such as various data and a program. Examples of the storing device 1c include various storage device such as a semiconductor drive device such as a Solid State Drive (SSD), a magnetic disk device such as a Hard Disk Drive (HDD), a non-volatile memory. Examples of the non-volatile memory include a flash memory, a Storage Class Memory (SCM), and a Read Only Memory (ROM).

The storing device 1c may also store a program 1g that implements all or some of the various functions of the server 1. For example, the processor 1a of the server 1 can achieve the function as the processing unit 10 to be described below and illustrated in FIG. 7 by expanding the program 1g (process allocation (arrangement) determining program) stored in the storing device 1c onto the memory 1b and executing the expanded program 1g. The function of the processing unit 10 may include functions as an OS 20, a determination process 30, and multiple processes 40, which will be described below.

The IF device 1d is an example of a communication IF that controls the connection and communication with a non-illustrated network. For example, the IF device 1*d* may include an adapter conforming to a Local Area Network (LAN) such as Ethernet (registered trademark), optical communication (e.g., Fibre Channel (PCs)), or the like. For example, the program 1*g* may be downloaded from a network to the server 1 via the communication IF and stored into storing device 1*c*.

The I/O device 1*e* may include one or both of an input device, such as a mouse, a keyboard, or an operating button, and an output device, such as a touch panel display, a monitor, such as a Liquid Crystal Display (LCD), a projector, or a printer.

The reader 1*f* is an example of a reader that reads information of data and programs recorded on a recording medium 1*h*. The reader 1*f* may include a connecting terminal or device to which the recording medium 1*h* can be connected or inserted. Examples of the reader 1*f* include an adapter conforming to, for example, Universal Serial Bus (USB), a drive apparatus that accesses a recording disk, and a card reader that accesses a flash memory such as an SD card. The program 1*g* may be stored in the recording medium 1*h*. The reader 1*f* may read the program 1*g* from recording medium 1*h* and store the read program 1*g* into the storing device 1*c*.

The recording medium 1*h* is example of a non-transitory recording medium such as a magnetic/optical disk, and a flash memory. Examples of the magnetic/optical disk include a flexible disk, a Compact Disc (CD), a Digital Versatile Disc (DVD), a Blu-ray disk, and a Holographic Versatile Disc (HVD). Examples of the flash memory include a semiconductor memory such as a USB memory and an SD card.

The HW configuration of the server 1 described above is merely illustrative. Accordingly, the server 1 may appropriately undergo increase or decrease of HW (e.g., addition or deletion of arbitrary blocks), division, integration in an arbitrary combination, and addition or deletion of the bus.

[1-2-2] Example of Functional Configuration

Figure 8:
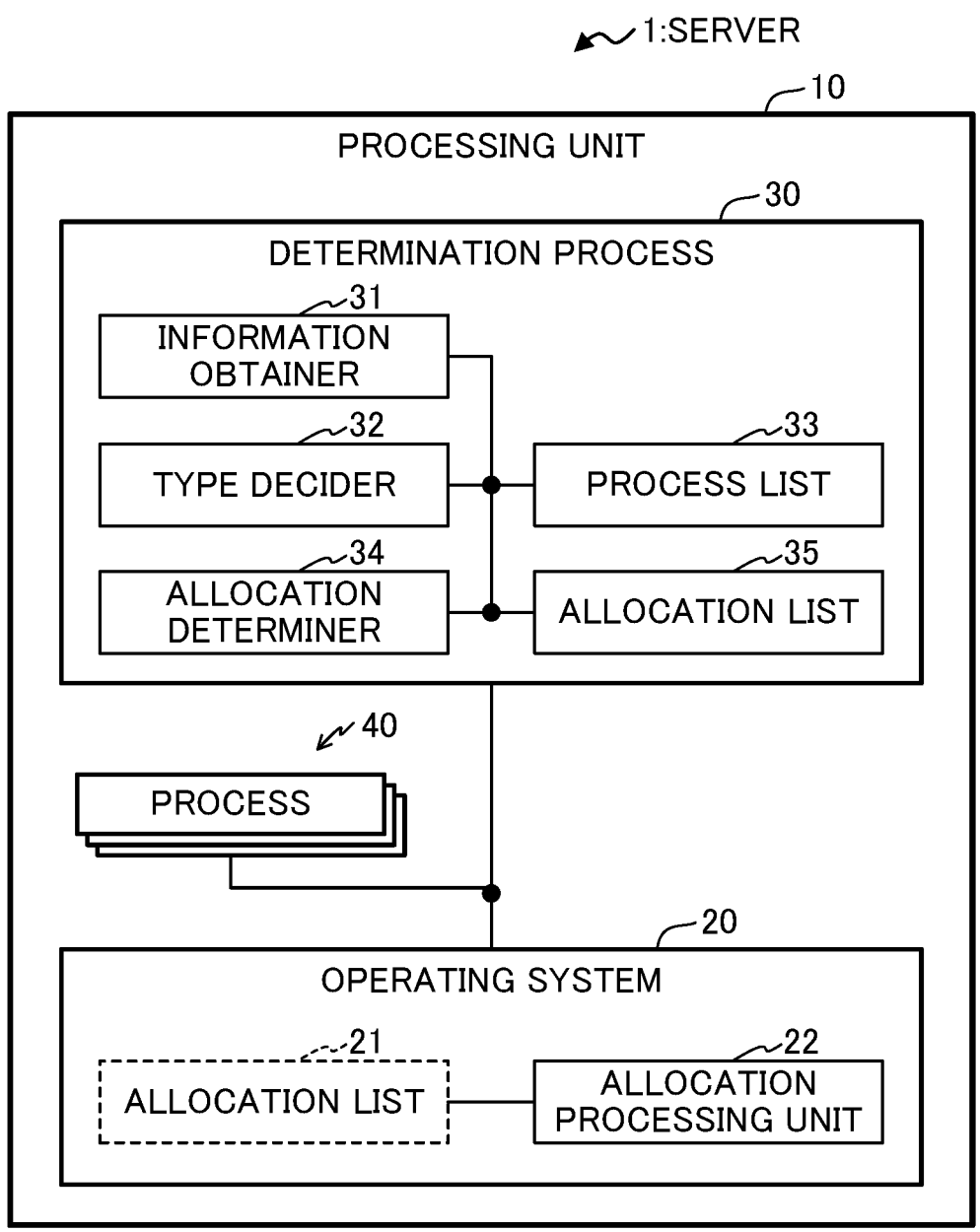
FIG. 8 is a block diagram schematically illustrating an example of a functional configuration of a server according to the embodiment.

FIG. 8 is a block diagram schematically illustrating an example of a functional configuration of the server 1 according to one embodiment. As illustrated in FIG. 8, focusing on the function related to the process allocation according to one embodiment, the server 1 may illustratively be provided with the function of the processing unit 10. The processing unit 10 may be achieved by multiple processors 2 of the server 1 exemplarily illustrated in FIG. 7 executing program 1*g* expanded on the DRAM 3 or the PM 4.

As illustrated in FIG. 8, the processing unit 10 may illustratively include the operating system (OS) 20, the determination process 30, and the multiple processes 40.

The OS 20 is an example of basic software that manages and controls the server 1, and is software that enables various applications to utilize the HW resource and/or the software (SW) resource of the server 1.

The OS 20 may be illustratively provided with an allocation list 21, and an allocation processing unit 22.

FIG. 9 is a diagram illustrating an example of the allocation list 21. The allocation list 21 is a list that records therein processes to be allocated to processor sockets (in other words, processors 2) included in the server 1. As illustrated in FIG. 9, the allocation list 21 may illustratively include items of a socket ID (Identifier), and a process ID. The socket ID is an example of an identification information of a socket (for example, a CPU socket) on which the processor 2 is implemented. The process ID is an example of an identification information of the process 40 to be allocated to the socket.

In one embodiment, the processes 40 that are to be allocated to sockets may be limited to some processes 40 of the processes 40 executed in the processor 10. For example, the process 40 to be allocated may be limited to a process 40 of a particular type that prospects loads of a certain level or more. Incidentally, a process 40 of the process allocation determining program according to one embodiment may be excluded from the processes 40 to be allocated.

Examples of a process 40 of the particular type include a process 40 of a Virtual Machine (VM) or a container. If the process 40 to be allocated is the VM, the term "OS 20" may be read as a "hyperviser" in the following description.

The process 40 of the particular type may also include, for example, a process 40 in which a parameter representing a process load exceeds a threshold value. Example of the parameter representing the process lead include, for example, at least one type of a using rate of the core 2*a*, a using rate of the bandwidth of the network, and a memory access frequency to be described below. The threshold of the parameter may be set for each type of the parameter, for example.

One embodiment assumes that, among the multiple processes 40 to be executed by the server 1, the number of processes 40 to be allocated is greater than the number of sockets of the processors 2. For example, one embodiment, likewise the example illustrated in FIG. 4, assumes that the number of sockets is "two", whereas the number of processes 40 to be allocated is "four".

Upon notification of an allocation list 35 from the determination process 30 to be described below, the OS 20 may store the notified allocation list 21 into the storing region of the memory 1*b*, such as the DRAM 3, for an allocating process by the allocation processing unit 22. Alternatively, the OS 20 may use the allocation list 35 generated by the determination process 30, not possessing the allocation list 21.

The allocation processing unit 22 allocates a process 40 to the processor 2 on the basis of the allocation list 21 (or 35). For example, the allocation processing unit 22 may allocate a process 40 having a process ID registered in the allocation list 21 to the processor 2 of the socket ID associated with this process ID.

Thus, after the allocation list 35 is determined by the determination process 30, the OS 20 migrates the data of each process 40 to be subjected to allocating process to the DRAM 3 or the PM 4 connected to the socket of the allocation destination. Incidentally, the process of migrating the data of a process 40 by the OS 20 can be performed by various known methods, so detailed description thereof will be omitted here. As an example, the allocating process by the OS 20 may employ data allocation method supported in architectures such as Non-Uniform Memory Access (NUMA).

The determination process 30 grasps the feature of each process 40 in the hybrid memory system and determines the allocation of the process 40 to one of the sockets, considering the features. The determination process 30 may be implemented, for example, as software that operates in the background in the server 1. By way of example, the determination process 30 may be a runtime system that operates as user-level software on the OS 20. The determination process 30 may be one of the multiple processes 40 and may be performed by one or more cores 2*a* in any of the processors 2. The process 40 executing the determination process 30 is an example of the first processor.

As illustrated in FIG. 8, the determination process 30 may include, for example, an information obtainer 31, a type decider 32, a process list 33, an allocation determiner 34, and the allocation list 35.

The information obtainer 31 obtains variety of information to grasp the type of each process 40. The information obtainer 31 may illustratively obtain the following information of (a) and the information of at least one of (b) to (d) and output (notify) the obtained information to the type decider 32.

(a) A cache miss count "a" in the LLC 2b of each process 40 in each core 2a

(b) A loading count "b1" and a storing count "b2" of each process 40 in each core 2a

(c) An instruction execution count "c1" and a prefetching count "c2" of each process 40 in each core 2a

(d) An access destination "d" (DRAM access or PM access) of each process 40

The information (a), (b), and (c) can be obtained, for example, on the basis of information obtained by a performance counter provided to the respective cores 2a and information obtained from the OS 20. The performance counter may be a HW device implemented in each core 2a.

The performance counter may count, for example, the cache miss count of the LLC 2b, the loading count, the storing count, the instruction execution count, and/or the prefetching count in a unit of core 2a. The OS 20 may manage information indicating the core 2a that is to execute a process 40 (i.e., to which a process 40 is to be allocated). The information obtainer 31 may obtain these pieces of information from the performance counter and the OS 20, and obtain information (a), (b) and (c) based on the obtained pieces of information, for example.

Incidentally, in cases where the performance counter is capable of calculating the LLC MPKI, the information obtainer 31 may obtain the LLC MPKI from the performance counter.

The information (d) can be obtained from, for example, process information (not illustrated) that the OS 20 manages. The process information is information about a process 40 and may include, by way of example, information with which each process 40 is decided to access which memory of the DRAM 3 and the PM 4. In other words, the process information is information that associates a process 40 with the memory serving as the access destination of the same process 40.

As described above, the information obtainer 31 is an exemplary of an obtaining unit. The information obtainer 31 serving as the obtaining unit may obtain, from each of the multiple cores 2a, at least one of information pieces of the cache miss count, the loading count, the storing count, the instruction execution count, and the prefetching count for each process 40 that the core 2a executes. Further, the information obtainer 31 serving as the obtaining unit may obtain information of the access destination of each of the multiple processes 40 from the OS 20 that the multiple processors 2 execute.

The type decider 32 decides the type of each process 40 on the basis of the information obtained by the information obtainer 31, and generates the process list 33 using the result of the deciding. The deciding of the type of a process 40 may be interpreted as grasping of the feature (in other words, "characteristic") of the process 40.

FIG. 10 is a diagram illustrating an example of the process list 33. As illustrated in FIG. 10, the process list 33 may illustratively include items of the process ID, the LLC MPKI, a read/write, a sequential/random, and a DRAM/PM.

The item of the process ID is an example of the identification information of the process 40 to be allocated. The item of the LLC MPKI is one example of a memory access frequency. The item of the read/write is information indicative of whether the process 40 is a read intensive or a write intensive. The item of the sequential/random is information indicative of whether the process 40 is a sequential access process or a random access process. The item of the DRAM/PM is information indicative of whether the process 40 accesses the DRAM 3 or the PM 4.

As illustrated in FIG. 10, the process list 33 may be sorted in the descending order of the LLC MPKI. In other words, entries may be registered in the process list 33 in order from a process ID having a larger memory access frequency to a process ID having a smaller memory access frequency.

The type decider 32 may decide at least of the following indexes of (A) and at least one of (B) and (C) on the basis of the information (a) and at least one of (b) to (d) obtained by the information obtainer 31, and generate the process list 33 using the result of the deciding.

(A) memory access frequency
(B) memory access pattern
(C) memory access destination In relation to the index (A), the type decider 32 may calculate the number of times of cache misses (LLC MPKIs) occurring in the LLC 2b per 1000 instructions for each process 40, and set the calculated number in the process list 33. In FIG. 10, the item LLC MPKI is represented by a reference symbol A in association with the above index (A).

For example, the type decider 32 may calculate the LLC MPKI based on the cache miss count a of the above item (a) and the instruction execution count c1 of the above item (c) that are obtained by the information obtainer 31, using following expression (1).

$$\text{LLC MPKI}=(a\times 1000)/c1 \qquad (1)$$

Incidentally, if the value of the LLC MPKI for each core 2a and also for each process 40 can be obtained from the performance counter, the type decider 32 may use the LLC MPKI obtained by the information obtainer 31, omitting the calculation using the above expression (1).

In relation to the index (B), the type decider 32 may decide the memory access pattern, in other words, the access tendency of a process 40. The access tendency may include, for example, whether the process 40 is the read intensive or the write intensive (read/write) and whether the process 40 is a sequential access or a random access (sequential/random). The type decider 32 may decide these access tendencies and set the result of the deciding to the process list 33. In FIG. 10, the item "read/write" and the item "sequential/random" are represented by reference symbols B1 and B2, respectively, in association with the above index (B) and are collectively indicated by reference symbol B.

For example, the type decider 32 may decide whether a process 40 is the read intensive or the write intensive by comparing the result of calculating a reading access rate of each process 40 using the following expression (2) with a threshold. Here, in the following expression (2), b1 and b2 are the loading count b1 (#loads) and the storing count b2 (#stores) obtained in the above item (b).

$$\text{reading access rate}=(b1/(b1+b2))\times 100[\%] \qquad (2)$$

For example, the type decider 32 may decide that the process 40 is a read access process (read intensive) when the calculated reading access rate is the threshold 90% or more, and decide that the process 40 is a write access process (write intensive) when the calculated reading access rate is less than 90%.

Alternatively, the type decider 32 may decide whether a process 40 is the sequential access process or the random access process by comparing the result of calculating a prefetching count per 1000 instructions on each process 40 using the following expression (3) with a threshold. Here, in the following expression (3), c1 and c2 are the instruction execution count c1 (#instructions), and the prefetching count c2 (#prefetches) obtained in the above item (c).

$$\text{prefetching count}=(c2\times 1000)/c1 \qquad (3)$$

For example, the type decider 32 may decide that the process 40 is the sequential access process when the calculated prefetching count is the threshold 10 times or more, and decide that the process 40 is the random access process when the calculated prefetching count is less than 10 times.

The thresholds of the reading access rate and the prefetching count are not limited to "90%" and "10 times", respectively, and may be set according to various conditions of, for example, the configuration of the server 1, the process performance or access performance of the processor 2 and the DRAM 3 or the PM 4.

In relation to the above index (C), the type decider 32 may decide the memory (DRAM/PM) of the access destination for each process 40 based on the access destination d obtained in the above item (d) and set the decided memory into the process list 33. In FIG. 10, the item DRAM/PM is represented by the reference symbol C in association with the above index (C).

As described above, the type decider 32 is an example of a deciding unit that decides the frequency of an access, the tendency of the access, and the DRAM 3 or the PM 4 of the access target as the characteristic of each of the multiple processes 40. The type decider 32 serving as the deciding unit may generate the process list 33 in which the frequency of an access, the tendency of the access, and the target of the access for each of multiple processes 40 are sorted by the frequency of the access.

The allocation determiner 34 determines the allocation of each of multiple processes 40 to be allocated with respect to the processor 2 based on the process list 33. The allocation determiner 34 may, for example, register the determined allocation into the allocation list 35 and notify the registered allocation list 35 to the OS 20. The OS 20 allocates the processes 40 on the basis of the allocation list 35 (21) notified by the allocation determiner 34.

For example, the allocation determiner 34 may determine the allocation to satisfy at least one of the following conditions (I) to (III) on the basis of the process list 33, the tendencies (i) and (ii) described above and depending on the types of processes 40 performed simultaneously in a single socket.

(I) If the process list 33 includes a process 40 that randomly reads data from the PM 4.

In the above case (I), the allocation determiner 34 determines to allocate the process 40 to the same socket to which a process having a high access frequency to the DRAM 3.

(II) If the process list 33 includes a process 40 that writes data into the PM 4.

In the above case (II), the allocation determiner 34 determines to allocate the process 40 to the same socket to which a process having a low memory access frequency.

(III) Cases of the combinations except for the above cases (I) and (II).

In the above case (III), the allocation determiner 34 determines the allocation of the process 40 on the basis of the memory access frequency.

As described above, the allocation determiner 34 is an example of a determining unit that determines, based on a characteristics of each of a plurality of the processes 40 accessing data stored in the PM 4 or the DRAM 3 in each of the plurality of groups including the PM 4 and the DRAM 3, an allocation of the plurality of processes 40 onto the plurality of processors 2.

The determination of the allocation of the processes by the allocation determiner 34 may be performed by a variety of techniques for optimizing the allocation. A manner of optimizing the allocation will be described in the following example of the operation to be described with reference to the flowcharts.

FIG. 11 is a diagram illustrating an example of the allocation list 35 set on the basis of the process list 33 exemplarily illustrated in FIG. 10 when the allocation determiner 34 determines the allocation of the processes 40. As exemplarily illustrated in FIG. 11, the allocation list 35 may include items of a socket ID and a process ID as well as the allocation list 21.

As exemplarily illustrated in FIG. 11, in the allocation list 35, the process IDs "0" and "3" are determined to be allocated to the socket ID "0", and the process IDs "1" and "2" are determined to be allocated to the socket ID "1".

Figure 12:
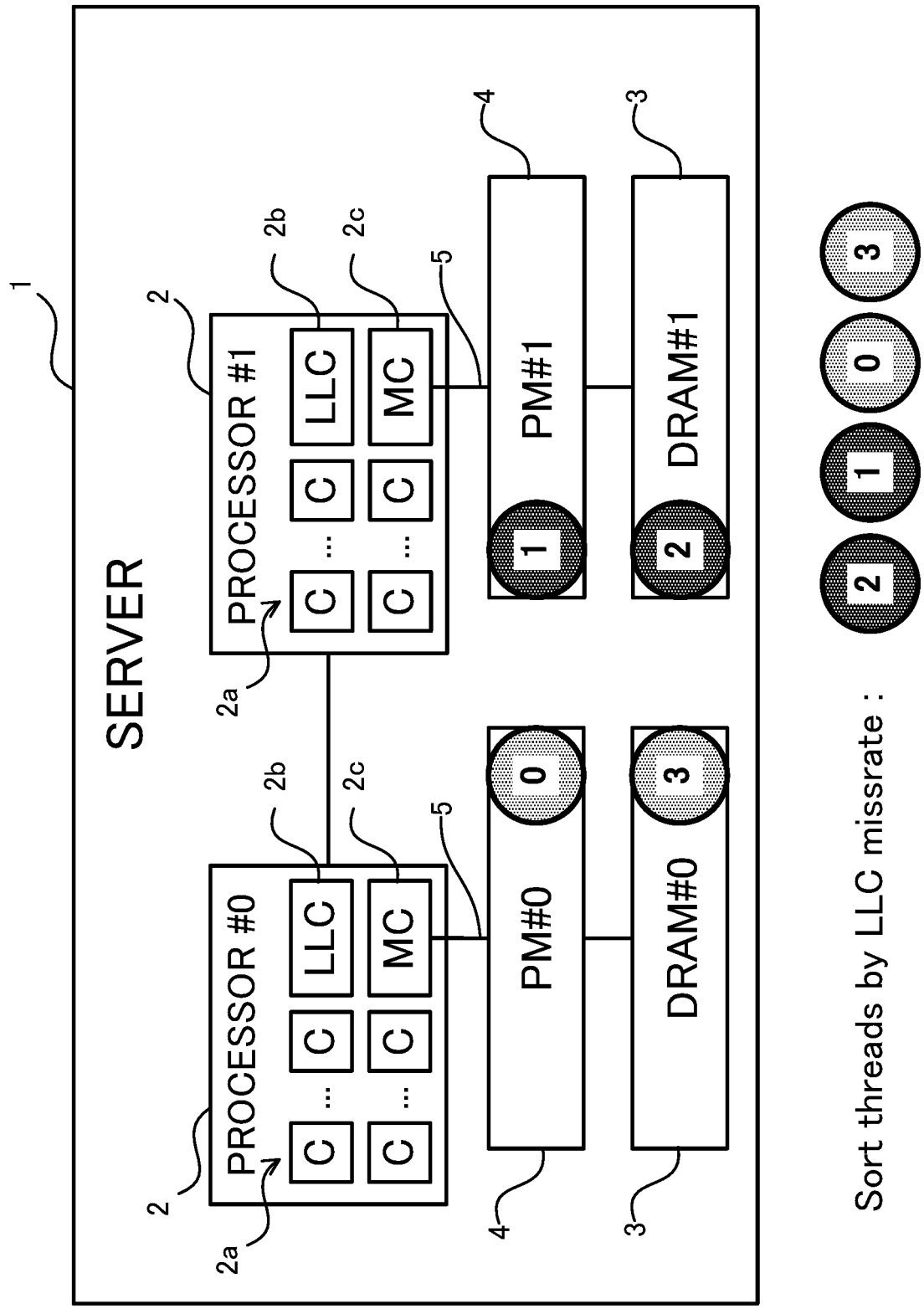
FIG. 12 is a diagram illustrating an example of a case where processes are allocated to processors according to the allocation list exemplarily illustrated in FIG. 11 by an allocation processing unit of an OS.

FIG. 12 is a diagram illustrating an example of a case where a process 40 is allocated to the processor 2 according to the allocation list 35 illustrated in FIG. 11 by the allocation processing unit 22 of the OS 20. As exemplarily illustrated in FIG. 12, a combination of processes 40 having small memory access frequencies is allocated to the processor #0, and a combination of processes 40 having large memory access frequencies is allocated to the processor #1.

Figure 13:
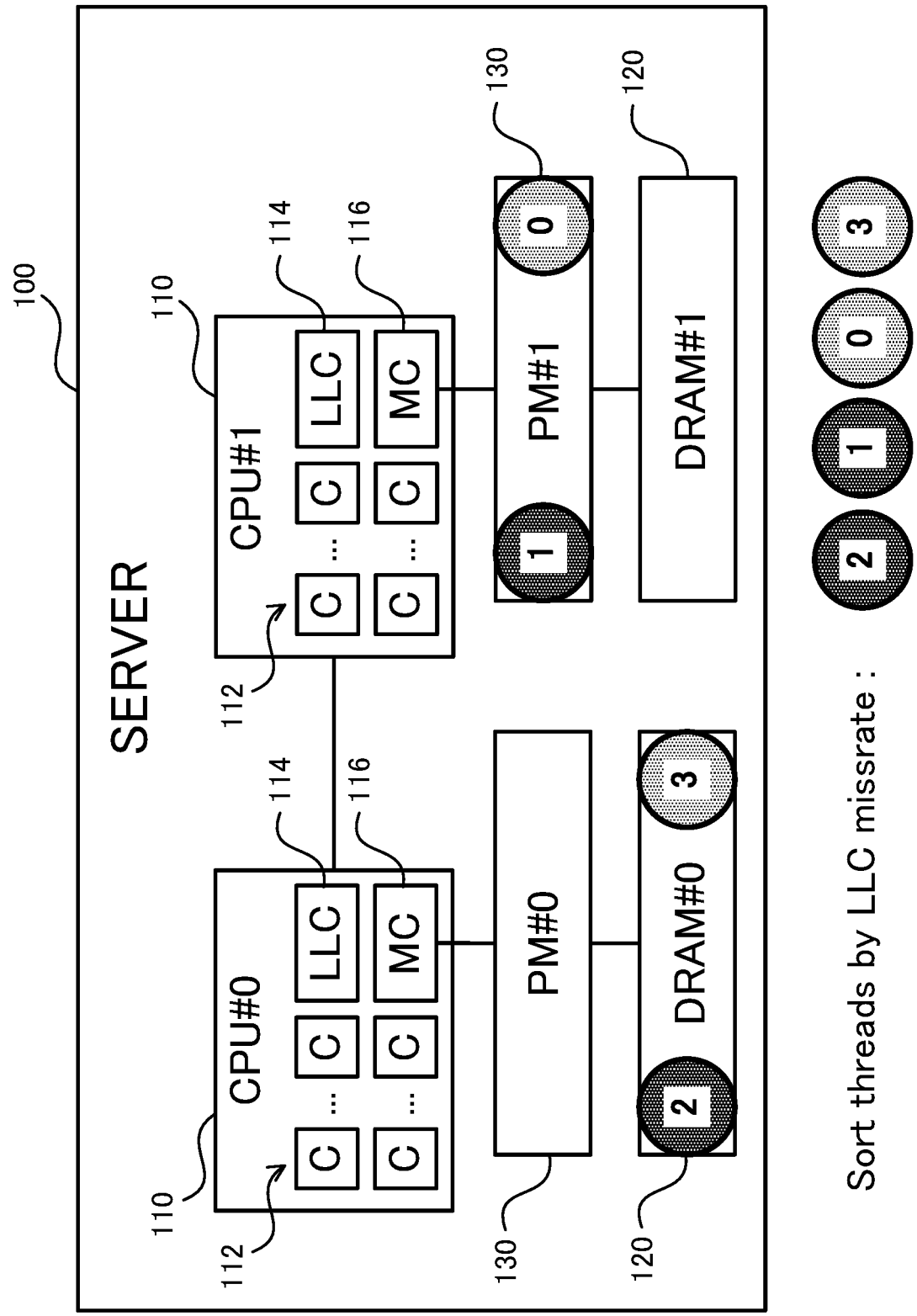
FIG. 13 is a diagram illustrating an example of a case where a process is allocated to a processor in the manner illustrated in FIG. 4.

In the manner of performing process allocation based on the memory access frequencies exemplarily illustrated in FIG. 4, the memory access frequencies themselves are distributed among the processors 2, but accesses are concentrated on the DRAM #0 in processor #0 and on the RM #1 in processor #1 as illustrated in FIG. 13.

In the example of FIG. 13, a process 40 (process ID "1") that randomly reads data from the M #1 is allocated to the same processor #1, to which a process 40 (process ID "0") that accesses the PM #1 not the DRAM #1. Therefore, this case does not match the above tendency (i) so that the effect that the performance degradation is low is not obtained.

Also in the example of FIG. 13, the process 40 (process ID "0") that writes data into the PM #1 is allocated the same processor #1, to which the process 40 (process ID "1") that has a high memory access frequency. Therefore, this case matches the above tendency (ii) so that the performance deterioration of least the process 40 (process ID "1") is large.

In contrast, in the example illustrated in FIG. 12, the processes 40 (process IDs "0" and "3") are allocated to the processor #0 so as not to match the above tendency In addition, the processes 40 (process IDs "1" and "2") are allocated to the processor #1 so as to match the above tendency (i).

According to the verification by the inventor, the allocation of the processes 40 as exemplified in FIG. 12 enhances the performance by about 50% as compared with the example of FIG. 13.

Thus, the allocation determiner 34 allocates processes 40 which would result in low performance degradation even if being a allocated to the same socket to the same socket so as to match the above tendency (i) on the basis of the above condition (I).

Further, the allocation determiner 34 allocates processes 40 which would result in large performance degradation if being allocated to the same socket to different sockets so as to match the above tendency (ii) on the basis of the above condition (II).

As described above, the allocation of processes 40 in obedience to at least one of the conditions (I) and (II) can achieve appropriate process allocation considering the "compatibility" between processes 40. In other words, the allocation determiner 34 can determine the appropriate allocation of the processes 40 based on the frequencies of the accesses, the tendencies of the accesses, and the combination of the targets of the accesses.

Accordingly, this can reduce the possibility of occurrence of a conflict between the processing on the DRAM 3 and the processing on the PM 4 in the MC 2c and also can suppress an increase in process time in the MC 2c. Consequently, it is possible to suppress a decrease in process performance of the processor 2.

In one embodiment, it is sufficient to perform the process allocation so as to satisfy at least one of the above conditions (I) and (II). In other words, the process allocation based on at least one of the above conditions (I) and (II) may be omitted.

Furthermore, the allocation determiner 34 allocates, by the above condition (III), a process 40 that does not fall under the above tendencies (i) and (ii), to the socket based on memory access frequency. Thus, it is possible to appropriately allocate a process 40 that satisfies neither of the conditions (I) and (II).

Thus, according to one embodiment, the conflict in using shared memory resources among the processes 40 can be mitigated by determining the process allocation between the sockets on the basis of the characteristic of the processes 40 executed in the hybrid memory systems having a single layer and being shared between multiple cores 2a.

[1-3] Example of Operation

Next, description will now be made in relation to an example of operation of the server 1 according to one embodiment configured as the above with reference to FIGS. 14 to 17. Here, the server 1 is provided with two processors 2 as illustrated in FIG. 7, and is assumed to execute at least the four processes 40 (process IDs "0" and "3") illustrated in FIG. 10.

[1-3-1] Example of Overall Operation

First, referring to FIG. 14, an example of the overall operation of the allocation of a process 40 by the server 1 will be described.

Figure 14:
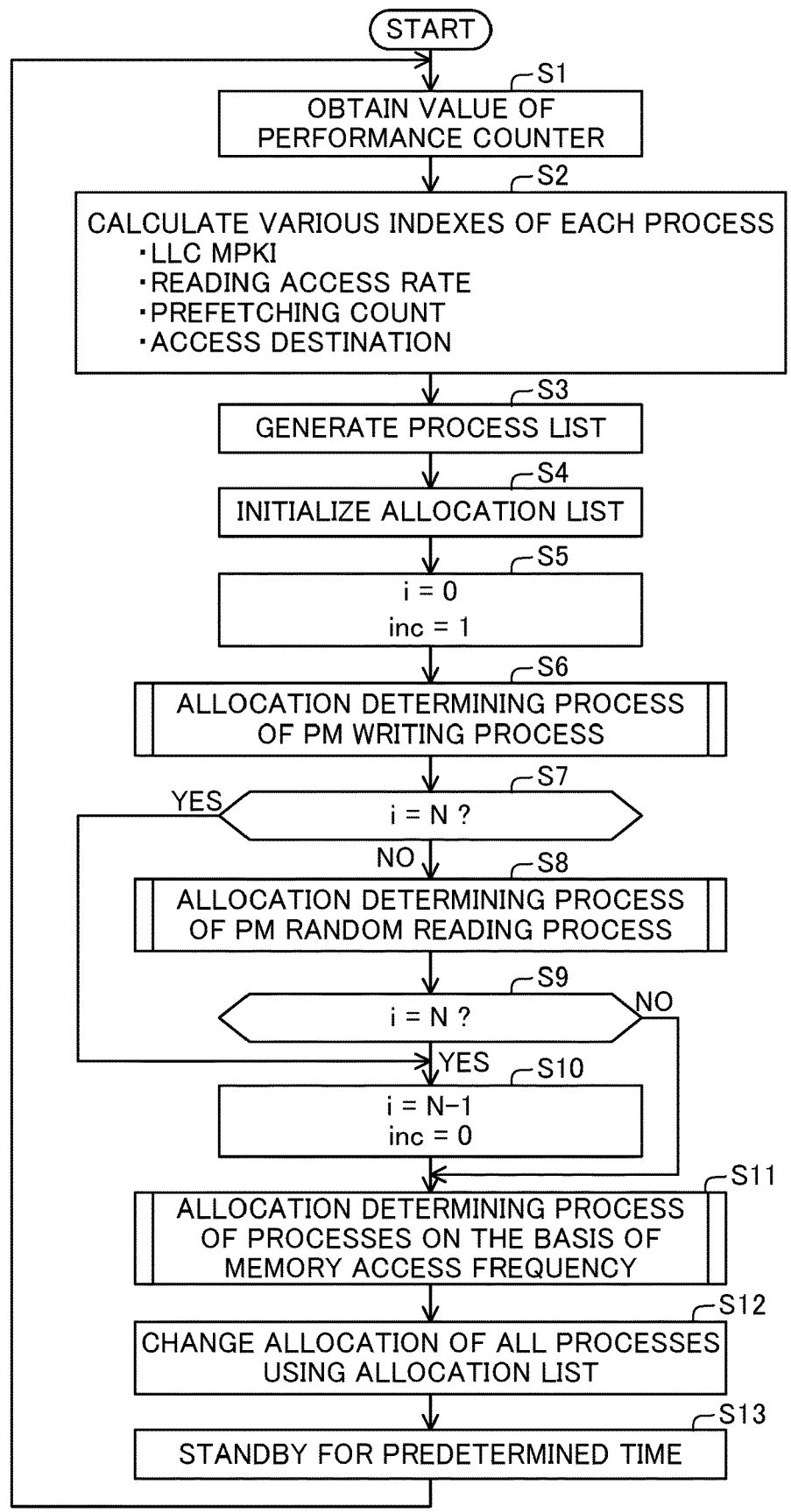
FIG. 14 is a flowchart illustrating an example of operation in a server according to the embodiment.

As exemplarily illustrated in FIG. 14, when the determination process 30 of the server 1 is activated, the information obtainer 31 obtains the value of the performance counter (Step S1). For example, the information obtainer 31 obtains, for example, the cache misses count a, the loading count b1, the storing count b2, the instruction execution count c1, the prefetching count c2, and the access destination d of each process 40 in each processor 2.

The type decider 32 calculates each index of each process 40 based on the information obtained by the information obtainer 31 (Step S2). Examples of indexes include the LLC MPKI serving as examples of memory access frequency, the reading access rate, the prefetching count, and the access destination.

The type decider 32 generates the process list 33 (see FIG. 10) that registers therein the calculated indexes (Step S3).

The allocation determiner 34 initializes the allocation list 35 (Step S4). The allocation determiner 34 initializes the allocation list 35 by setting the variable i specifying the socket ID of the processor 2 and the variable inc indicating a switching direction of the socket ID when allocating the process 40 to a socket to "0" and "1", respectively (Step S5).

The allocation determiner 34 performs an allocation determining process on a writing process 40 to the PM 4 on the basis of the process list 33 (Step S6), and decides whether the variable i is the socket number N representing the number of sockets that the server 1 includes (Step S7). If the allocation determiner 34 decides that the variable i is the socket number N (YES in Step S7), the process proceeds to Step S10.

If the allocation determiner 34 decides that the variable i is not the socket number N (NO in Step S7), the allocation determiner 34 performs an allocation determining process on a random reading process 40 to the PM 4 on the basis of the process list 33 (Step S8). Then, the allocation determiner 34 decides whether the variable i is the socket number N (Step S9).

If the allocation determiner 34 decides that the variable i is not the socket number N (NO in Step S9), the process proceeds to Step S11. On the other hand, if the allocation determiner 34 decides that the variable i is the socket number N (YES in Step S9), the allocation determiner 34 sets the value obtained by subtracting one from the socket number N in the variable i and sets 0 in the variable inc (Step S10), and the process proceeds to Step S11. In Step S11, the allocation determiner 34 performs an allocation determining process on the process 40 on the basis of the memory access frequency.

By executing at least one of the processes Steps S6, S8, and S11, the allocation list 35 (FIG. 11) is set. The allocation determiner 34 notifies the OS 20 of the allocation list 35.

The allocation processing unit 22 of the OS 20 uses the allocation list 35 (21) to change the allocations of all the processes 40 in at least allocation list 35 (21) (Step S12). The determination process 30 waits for a period of time (Step S13) and the process moves to Step S1.

[1-3-2] Allocation Determining Process of PM Writing

Next, description will now be made, by referring to FIG. 15, in relation to an example of the operation of the allocation determining process of the PM writing process 40 illustrated in Step S6 of FIG. 14.

Figure 15:
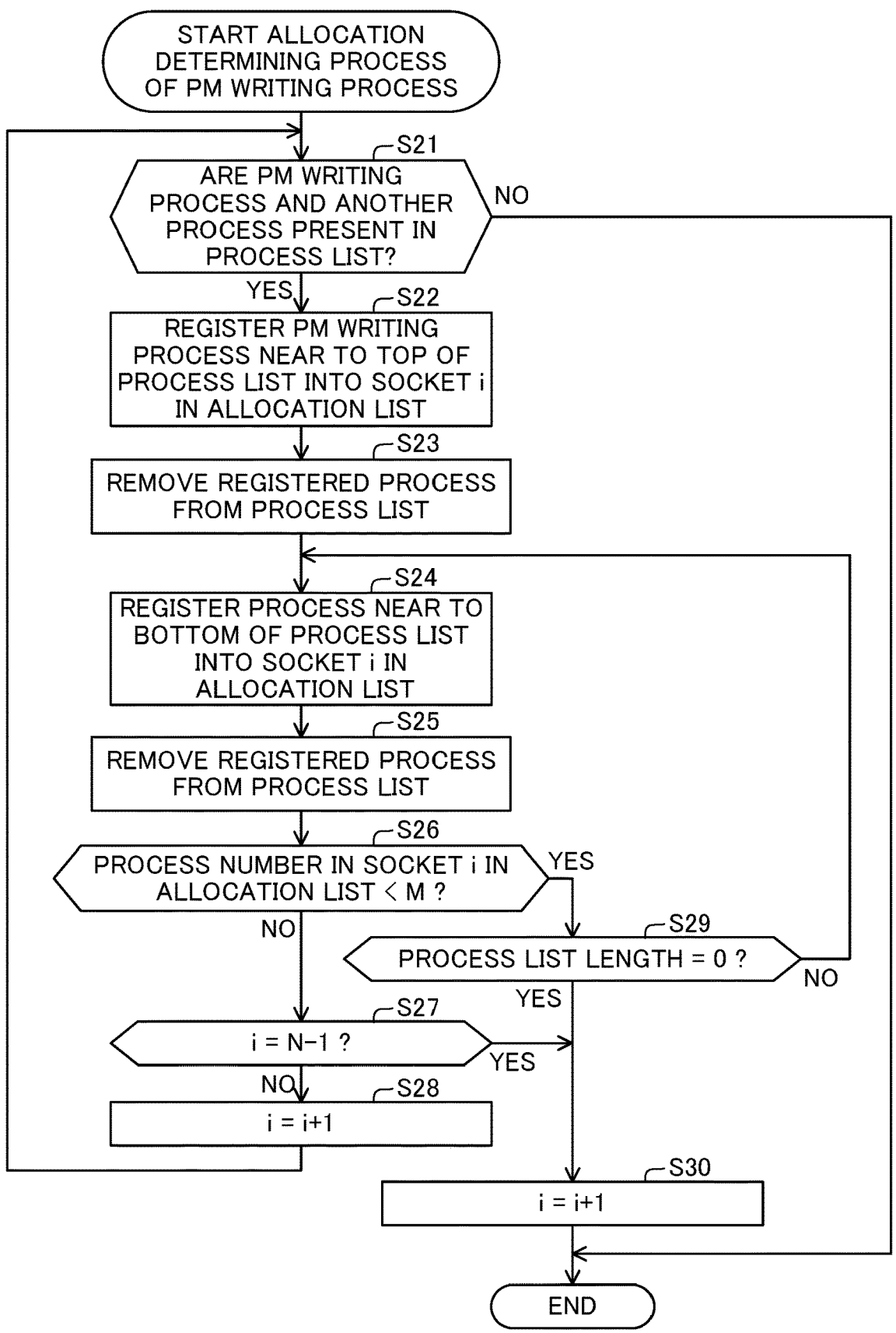
FIG. 15 is a flowchart illustrating an example of operation of an allocation determining process of a PM writing process illustrated in FIG. 14.

As illustrated in FIG. 15, the allocation determiner 34 decides whether the writing process 40 to the PM 4 and another process 40 are present in the process list 33 (Step S21). The writing process 40 to the PM 4 may mean a writing process 40 that sequentially or randomly accesses the PM 4. Another process 40 may mean any type of process 40 and refers to a reading or writing process 40 that perform sequentially or randomly accesses the DRAM 3 or the PM 4. The decision in Step S21 can be regarded as decision as to whether or not a process 40 to be subjected to the allocation determination in obedience to the above condition (II) is present in the process list 33.

If the allocation determiner 34 decides that neither the above two processes 40 are present in the process list 33 (NO in Step S21), the process ends.

On the other hand, if the allocation determiner 34 decides that the above two processes 40 are present in the process list 33 (Yes in Step S21), the allocation determiner 34 registers the PM writing process 40 near to the top of the process list 33 into the socket i in the allocation list 35 (Step S22). Since the processes 40 in the process list 33 are sorted in the descending order of the memory access frequency, if two or more PM writing processes 40 are present, the PM writing processes 40 are sequentially registered into the allocation list 35 from the PM writing process 40 having the largest memory access frequency among the processes 40 remaining in the process list 33 in Step S22.

The allocation determiner 34 then removes the PM writing processes 40 registered in the allocation list 35 from the process list 33 (Step S23).

Further, the allocation determiner 34 registers the process 40 on the bottom of the process list 33, in other words, the process 40 having the smallest memory access frequency, into the socket i in the allocation list 35 (Step S24). The allocation determiner 34 then removes the registered process 40 from the process list 33 (Step S25).

The allocation determiner 34 decides whether or not the process number of the processes allocated to the socket i in the allocation list 35 is less than a process number M per socket (Step S26). The process number M per socket may be obtained by dividing the number of processes to be allocated by the number of sockets provided to the server 1.

If the allocation determiner 34 decides that the process number of the processes allocated to the socket i is net less than the process number K per socket (in other words, the number of processes M or more) (NO in Step S26), the allocation determiner 34 decides whether or not the variable i is N−1 (Step S27). In Step S27, whether or not a process 40 is allocated to the socket having the largest socket ID is decided.

If the variable i is decided not to be N−1 (NO in Step S27), the allocation determiner 34 adds (in increment of) one to the variable i (Step S28), and the process proceeds to Step S21.

On the other hand, if the allocation determiner 34 decides that the variable i is N−1 (YES in Step S27), the process proceeds to Step S30.

In Step S26, if the allocation determiner 34 decides that the process number of the processes allocated to the socket i is less than the process number M per socket (YES in Step S26), the allocation determiner 34 decides whether or not a process list length is 0 (Step S29). In this case, since a process 40 can still be allocated to the socket i, the allocation determiner 34 decides whether the data length of process list 33 is 0 (i.e., whether no entry exists).

If the allocation determiner 34 decides that the process list length is not 0 (NO in Step S29), the process proceeds to Step S24 and the allocation determiner 34 registers the other process 40 into the socket i in the allocation list 35.

On the other hand, if the allocation determiner 34 decides that the process list length is 0 (YES in Step S29), the allocation determiner 34 adds (in increment of) 1 to the variable i (Step S30) and the process ends.

As described above, in the allocation determination based on the above condition (II), the allocation determiner 34 performs the following process on the basis of the process list 33.

The allocation determiner 34 determines that a process 40 having an access tendency of a writing access and an access target of the PM 4 and a process 40 having the smallest access frequency among the processes 40 included in the process list 33 are allocated the same processor 2. The allocation determiner 34 also removes the information of the processes 40 whose allocation is determined from the process list.

[1-3-3] Allocation Determining Process of PM Random Reading Process

Next, description will now be made, by referring to FIG. 16, in relation an example of the operation of the all cation determining process of the PM random reading process 40 illustrated in Step S8 of FIG. 14.

Figure 16:
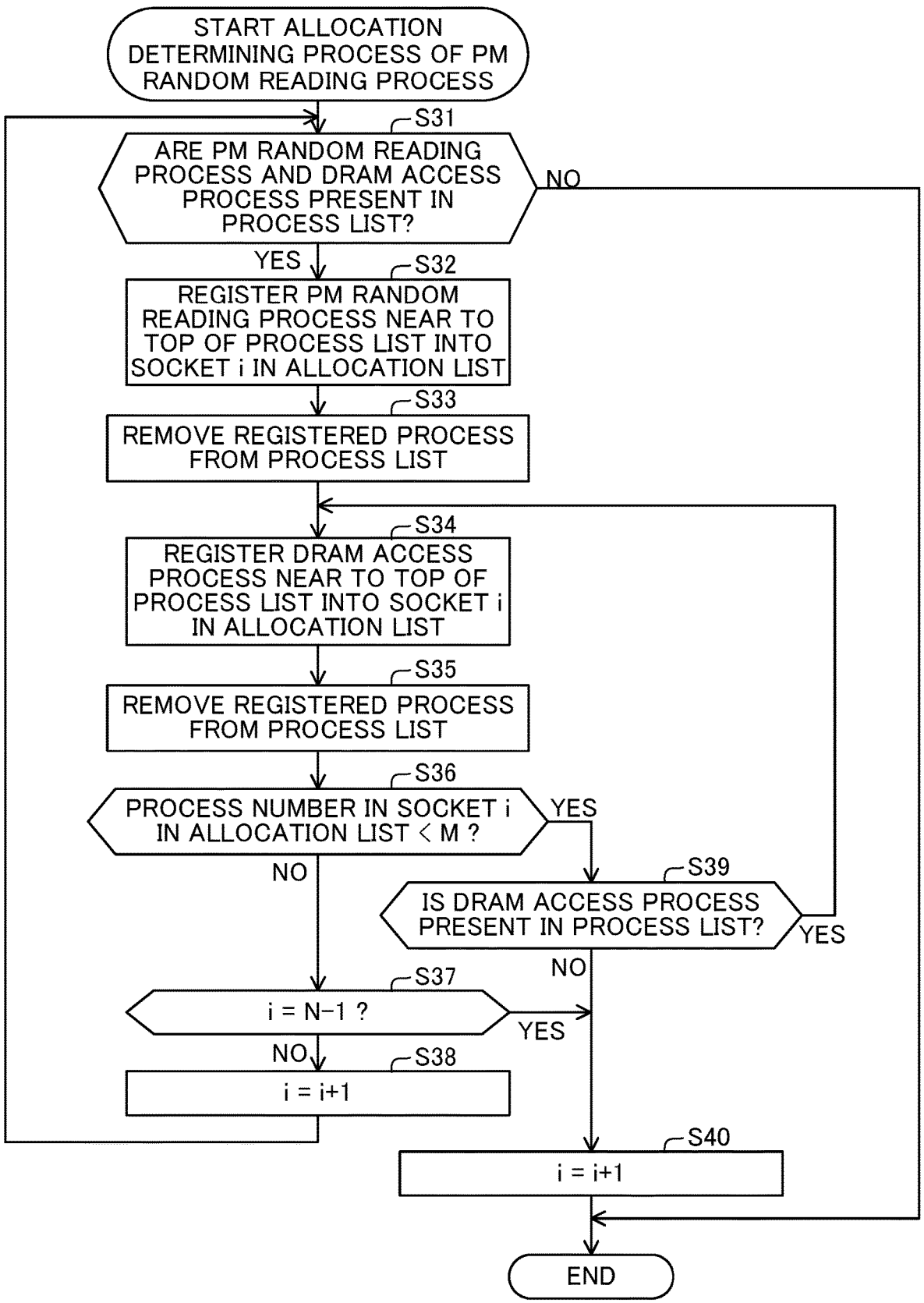
FIG. 16 is a flowchart illustrating an example of operation of an allocation determining process of a PM random reading process illustrated in FIG. 14.

As illustrated in FIG. 16, the all cation determiner 34 decides whether a random reading process 40 to the PM 4 and an access process 40 to the DRAM 3 are present in the process list 33 (Step S31). The random reading process 40 to the PM 4 mean a reading process 40 that randomly accesses to the PM The access process 40 to the DRAM 3 may mean a writing or reading process 40 that sequentially or randomly accesses the DRAM 3. The decision in Step S31 can be regarded as decision as to whether or not a process 40 to be subjected to allocation determination in obedience to the above condition (I) is present in the process list 33.

If the location determiner 34 decides that neither the above two processes 40 are present in the process list 33 (NO in Step 31), the process ends.

On the other hand, if the allocation determiner 34 decides that the above two processes 40 are present in the process list 33 (Yes in Step S31), the allocation determiner 34 registers the PM random reading process 40 near to the top of the process list 33 into the socket i in the allocation list 35 (Step S32). Since the process 40 in the process list 33 are sorted in the descending order of the memory access frequency, if two or more PM random reading processes 40 are present, the PM random reading processes 40 are sequentially registered into the allocation list 35 from the process 40 having the largest memory access frequency among the processes 40 remaining in the process list 33 in Step S32.

The allocation determiner 34 then removes the PM random reading processes 40 registered in the allocation list 35 from the process list 33 (Step S33).

Further, the allocation determiner 34 registers a DRAM access process 40 near to the top of the process list 33, in other words, the DRAM access process 40 having the largest memory access frequency, into the socket i in the allocation list 35 (Step S34). The allocation determiner 34 then removes the registered process 40 from the process list 33 (Step S35).

The allocation determiner 34 decides whether or not the process number of the processes allocated to the socket i in the allocation list 35 is less than the process number M per socket (Step S36).

If the allocation determiner 34 decides that the process number of the processes allocated to the socket i is not less than the process number M per socket (in other words, the number of processes M or more) (NO in Step S36), the allocation determiner 34 decides whether or not the variable i is N−1 (Step S37).

If the variable i is decided not to be N−1 (NO in Step S37), the allocation determiner 34 adds (in increment of) one to the variable i (Step S38), the process proceeds to Step S31.

On the other hand, if the allocation determiner 34 decides that the variable i is N−1 (YES in Step S37), the process proceeds to Step S40.

In Step S36, if the allocation determiner 34 decides that the process number of the processes allocated to the socket i is less than the process number M per socket (YES in Step S36), the allocation determiner 34 decides whether or not the DRAM access process 40 is present in the process list 33 (Step S39).

If the allocation determiner 34 decides that the DRAM access process 40 is present in the process list 33 (YES in Step S39), the process proceeds to Step S34 and the allocation determiner 34 registers the other DRAM access process 40 into the socket i in the allocation list 35.

On the other hand, the allocation determiner 34 decides that the DRAM access process 40 is not present in the process list 33 (NO in Step S39), the allocation determiner 34 adds (in increment of) 1 to the variable i (Step S40) and the process ends.

As described above, in the allocation determination based on the above condition (I), the allocation determiner 34 performs the following process on the basis of the process list 33.

The allocation determiner 34 determines that a process 40 having an access tendency of a random reading access and an access target of the PM 4 and a process 40 having the largest access frequency among the processes 40 included in the process list 33 and having an access target of the DRAM 3 are allocated to the same processor 2. The allocation determiner 34 also removes the information of the processes 40 whose allocation is determined from the process list 33.

[1-3-4] Allocation Determining Process on the Basis of Memory Access Frequency

Next, description will now be made, by referring to FIG. 17, in relation to an example of the operation of the allocation determining process of a process 40 on the basis of the memory access frequency illustrated in Step S1 of FIG. 14.

Figure 17:
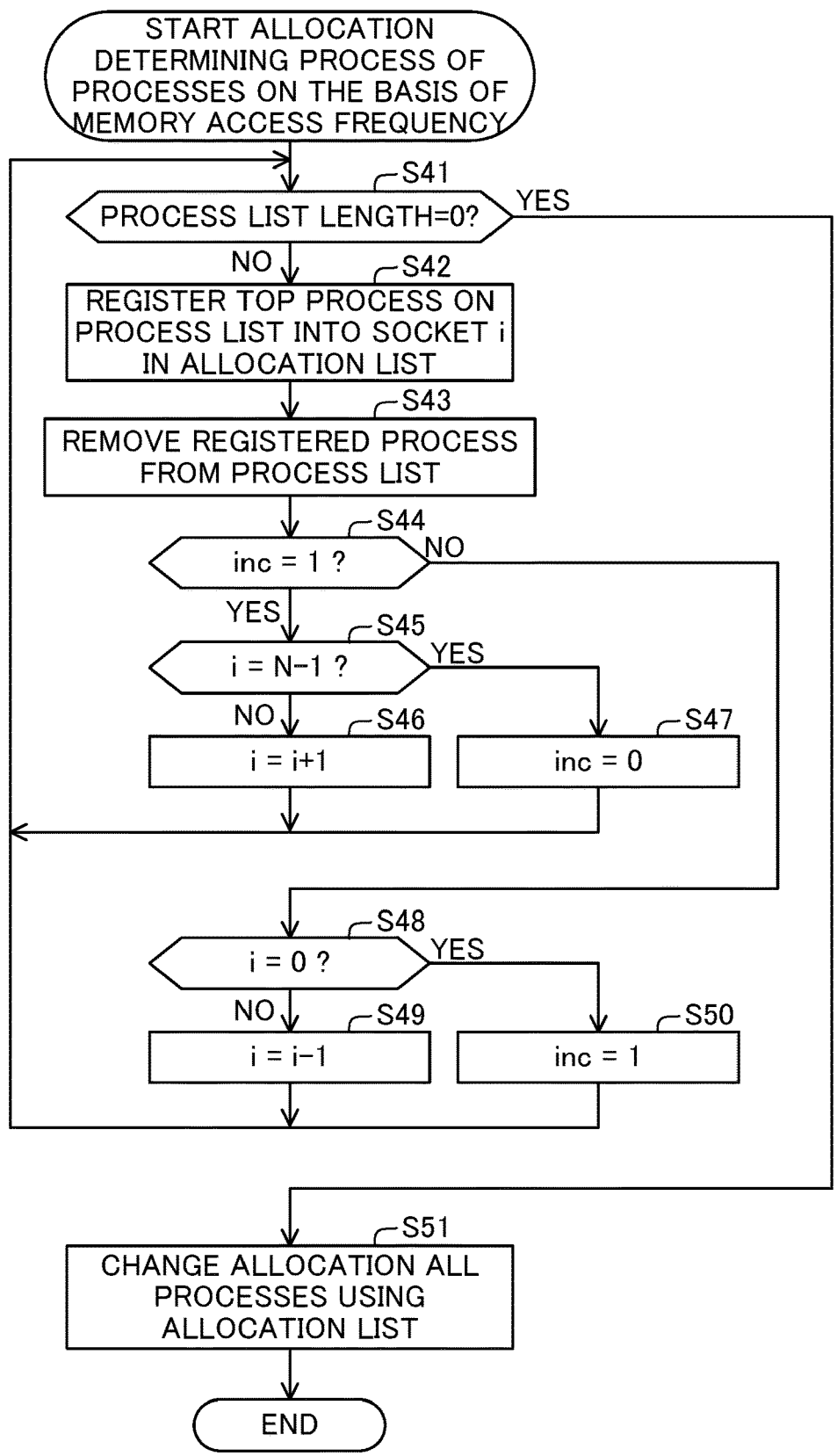
FIG. 17 is a flowchart illustrating an example of operation of an allocation determining process of a process based on a memory access frequency illustrated in FIG. 14.

As exemplarily illustrated in FIG. 17, the allocation determiner 34 decides whether or not the process list length is 0 (Step S41). If the allocation determiner 34 decides that the process list length is 0 (YES in Step S41), the process proceeds to Step S51. The decision of Step S41 can be regarded as decision as to whether or not a process 40 to be subjected to the allocation determination in obedience to the above condition (III) is present in the process list 33.

If the allocation determiner 34 decides that the process list length is not 0 (NO in Step S41), the allocation determiner 34 registers the top process 40 on the process list 33 into the socket i in the allocation list 35 (Step S42). Since the processes 40 in the process list 33 is sorted in the descending order of the memory access frequency, if two or more processes 40 are present, the processes 40 are sequentially registered into the allocation list 35 from the process 40 having the largest memory access frequency among the processes 40 remaining in the process list 33 in Step S42.

The allocation determiner 34 then removes the process 40 registered in the allocation list 35 from the process list 33 (Step S43).

The allocation determiner 34 decides whether or not the variable inc is 1 (Step S44). The decision of Step S44 corresponds to decision as to whether the direction of switching the socket ID when a process 40 is to be allocated to the socket is the direction of increasing the variable i.

If the allocation determiner 34 decides that the variable inc is 1 (YES in Step S44), the allocation determiner 34 decides whether or not the variable i is N−1 (Step S45). If the variable i is determined not to be N−1 (NO in Step S45), the allocation determiner 34 adds (in increment of) one to the variable i (Step S46), the process proceeds to Step S41.

On the other hand, if the variable i is decided to be N−1 (YES in Step S45), the allocation determiner 34 sets 0 in the variable inc (Step S47) and the process proceeds to Step S41. The process of Step S47 is an example of the process of changing the direction of switching a socket ID when a process 40 is allocated to a socket to a direction of decreasing the variable i.

In Step S44, if the variable inc is decided not to be 1 (NO in Step S44), the allocation determiner 34 decides whether or not the variable i is 0 (Step S48). If the variable i is decided not to be 0 (NO in Step S48), the allocation determiner 34 subtracts (in decrement of) 1 from the variable i (Step S49), and the process proceeds to Step S41.

In Step S48, if the variable i is decided to be 0 (YES in Step S48), the allocation determiner 34 sets 1 in the variable inc (Step S50) and the process proceeds to Step S41.

In Step S41, if the process list length is decided to be 0 (YES in Step S41), the allocation determiner 34 notifies the OS 20 of the content of the allocation list 35. In the OS 20, the allocation processing unit 22, changes the allocations of all the processes 40 using the allocation list 35 (21) (Step S51), and the process ends.

As described above, in the allocation determination based on the above condition (III), the allocation determiner 34 performs the following process on the basis of the process list 33.

On the basis of the process list 33, the allocation determiner 34 determines that the process 40 having the highest access frequency among the processes 40 included in the process list 33 and the process 40 having the lowest access frequency among the processes 40 included in the process list 33 are allocated to the same processor 2. The allocation determiner 34 also removes the information of the processes 40 whose allocation is determined from the process list 33.

[2] Miscellaneous

The technique according to one embodiment described above can be modified as follows.

For example, the functions of the determination process 30 and the OS 20 in the server 1 illustrated in FIG. 8 may be merged in any combination and may be divided respectively. Further, the functions of the information obtainer 31, the type decider 32, and the allocation determiner 34 may be merged in any combination, may be divided respectively.

In one aspect, it is possible to suppress lowering of a process performance in an information processing apparatus including a processor having a memory controller that controls accesses from processes to first and second memories having respective different process speeds.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An information processing apparatus comprising a plurality of groups, each group comprising a first memory, a second memory different in process speed from the first memory, and a processor comprising a memory controller that is connected to the first memory and the second memory and that controls an access from a process to the first memory and the second memory,
   a first processor among a plurality of the processors of the plurality of groups is configured to determine, based on a characteristic of each of a plurality of the processes accessing data stored in the first memory or the second memory in each of the plurality of groups, an allocation of the plurality of processes onto the plurality of processors such that a conflict between an access to the first memory and an access to the second memory is mitigated in the memory controllers included in the plurality of processors.

2. The information processing apparatus according to claim 1, wherein:
   the first processor decides, as the characteristic of each of the plurality of processes, a frequency of the access, a tendency of the access, and a target of the access that is to be accessed by the process between the first memory and the second memory; and
   the determining determines the allocation based on a combination of the frequency of the access, the tendency of the access, and the target of the access.

3. The information processing apparatus according to claim 2, wherein:
   the first processor generates a list containing the frequency of the access, the tendency of the access, and the target of the access of each of the plurality of processes by sorting by the frequency of the access; and
   the determining determines to allocate, based on the list, a first process having the tendency of the access being a writing access and the target of the access being the second memory and a second process having the frequency of the access being smallest among the plurality of processes contained in the list into a same processor, and removes information of the first process and the second process from the list.

4. The information processing apparatus according to claim 3, wherein:
   the determining determines to allocate, based on the list, a third process having the tendency of the access being a random reading access and the target of the access being the second memory and a fourth process having the frequency of the access being largest among the plurality of processes contained in the list and the target of the access being the first memory into a same processor, and removes information of the third process and the fourth process from the list.

5. The information processing apparatus according to claim 3, wherein:
   the determining determines to allocate, based on the list, a fifth process having the frequency of the access being largest among the plurality of processes contained in the list and a sixth process having the frequency of the access being smallest among the plurality of processes contained in the list into a same processor, and removes information the fifth process and the sixth process from the list.

6. The information processing apparatus according to claim 4, wherein:
   the determining determines to allocate, based on the list, a fifth process having the frequency of the access being largest among the plurality of processes contained in the list and a sixth process having the frequency of the access being smallest among the plurality of processes contained in the list into a same processor, and removes information the fifth process and the sixth process from the list.

7. The information processing apparatus according to claim 1, wherein:
   each of the plurality processors comprises one or more cores;
   the first processor obtains first information of at least one a cache miss count, a loading count, a storing count, an instruction execution count, and a prefetching count of each process executed by each of the cores from the core, and obtains second information of an access destination of each of the plurality of processes from an Operating System (OS) that the plurality of processors execute; and
   the deciding is based on the first information and the second information.

8. A non-transitory computer-readable recording medium having stored therein a process allocation determining program that causes a computer comprising a plurality of groups, each group comprising a first memory, a second memory different in process speed from the first memory, and a processor comprising a memory controller that is connected to the first memory and the second memory and that controls an access from a process to the first memory and the second memory to execute a process comprising:
   determining, based on a characteristic of each of a plurality of the processes accessing data stored in the first memory or the second memory in each of the plurality of groups, an allocation of the plurality of processes onto the plurality of processors such that a conflict between an access to the first memory and an access to the second memory is mitigated in the memory controllers included in the plurality of processors.

9. The non-transitory computer-readable recording medium according to claim 8, the process further comprising deciding, as the characteristic of each of the plurality of processes, a frequency of the access, a tendency of the access, and a target of the access that is to be accessed by the process between the first memory and the second memory, wherein
   the determining determines the allocation based on a combination of the frequency of the access, the tendency of the access, and the target of the access.

10. The non-transitory computer-readable recording medium according to claim 9, the process further comprising generating a list containing the frequency of the access, the tendency of the access, and the target of the access of each of the plurality of processes by sorting by the frequency of the access, wherein
   the determining determines to allocate, based on the list, a first process having the tendency of the access being a writing access and the target of the access being the second memory and a second process having the frequency of the access being smallest among the plurality of processes contained in the list into a same processor, and removes information of the first process and the second process from the list.

11. The non-transitory computer-readable recording medium according to claim 10, wherein:
   the determining determines to allocate, based on the list, a third process having the tendency of the access being a random reading access and the target of the access being the second memory and a fourth process having the frequency of the access being largest among the plurality of processes contained in the list and the target of the access being the first memory into a same processor, and removes information of the third process and the fourth process from the list.

12. The non-transitory computer-readable recording medium according to claim 10, wherein:
the determining determines to allocate, based on the list, a fifth process having the frequency of the access being largest among the plurality of processes contained in the list and a sixth process having the frequency of the access being smallest among the plurality of processes contained in the list into a same processor, and removes information the fifth process and the sixth process from the list.

13. The non-transitory computer-readable recording medium according to claim 11, wherein:
the determining determines to allocate, based on the list, a fifth process having the frequency of the access being largest among the plurality of processes contained in the list and a sixth process having the frequency of the access being smallest among the plurality of processes contained in the list into a same processor, and removes information the fifth process and the sixth process from the list.

14. The non-transitory computer-readable recording medium according to claim 8, wherein:
each of the plurality processors comprises one or more cores;
the process further comprises:
obtaining first information of at least one a cache miss count, a loading count, a storing count, an instruction execution count, and a prefetching count of each process executed by each of the cores from the core, and
obtaining second information of an access destination of each of the plurality of processes from an Operating System (OS) that the plurality of processors execute; and
the deciding is based on the first information and the second information.

* * * * *